(12) United States Patent
Raymond

(10) Patent No.: US 9,454,143 B2
(45) Date of Patent: Sep. 27, 2016

(54) ELECTRICAL TRANSFER CAPACITY OPTIMIZATION SYSTEMS AND METHODS THEREOF

(71) Applicant: Russell N. Raymond, Tolland, CT (US)

(72) Inventor: Russell N. Raymond, Tolland, CT (US)

( * ) Notice: Subject to any disclaimer, the term of this patent is extended or adjusted under 35 U.S.C. 154(b) by 436 days.

(21) Appl. No.: 14/045,071

(22) Filed: Oct. 3, 2013

(65) Prior Publication Data

US 2015/0100170 A1    Apr. 9, 2015

Related U.S. Application Data

(63) Continuation-in-part of application No. 13/073,333, filed on Mar. 28, 2011, now abandoned.

(51) Int. Cl.
*H02J 3/06* (2006.01)
*G05B 19/042* (2006.01)

(52) U.S. Cl.
CPC .............. *G05B 19/042* (2013.01); *H02J 3/06* (2013.01)

(58) Field of Classification Search
CPC ................................ G05B 19/042; H02J 3/06
USPC .................................................. 700/286
See application file for complete search history.

(56) References Cited

U.S. PATENT DOCUMENTS

| | | | |
|---|---|---|---|
| 5,140,257 A | 8/1992 | Davis | |
| 5,933,355 A * | 8/1999 | Deb | H02J 3/00 702/3 |
| 6,229,451 B1 | 5/2001 | Brown | |
| 6,304,838 B1 | 10/2001 | Brown | |
| 6,577,962 B1 | 6/2003 | Afshari | |
| 6,771,058 B2 | 8/2004 | Lapinksi et al. | |
| 7,088,090 B2 | 8/2006 | Staats | |
| 7,305,282 B2 | 12/2007 | Chen | |
| 2004/0102937 A1 | 5/2004 | Ibrahim | |
| 2005/0240381 A1 * | 10/2005 | Seiler | G06F 17/5009 703/1 |
| 2007/0032911 A1 | 2/2007 | Clesle et al. | |

(Continued)

OTHER PUBLICATIONS

Holbert & Heydt, Prospects for Dynamic Transmission Circuit Rating, The 2001 IEEE International Symposium on Circuits and Systems, vol. 3, May 6-9, 2001, pp. 205-208.

(Continued)

*Primary Examiner* — Mohammad Ali
*Assistant Examiner* — Yuhui R Pan
(74) *Attorney, Agent, or Firm* — UConn IP Clinic; Michael A. Blake; David M. Schwartz

(57) ABSTRACT

A method and system is provided for determining and optimizing electric transfer capacities of electric power system facilities. A processor receives and stores information that is used to compute the quantity of electric power that can flow through one or more electric power facilities. A capability datastore and an external factors datastore communicate with the processor and with each other. The capability datastore computes and stores the electrical transfer capability as a function time duration and at any given point in time while the external factors datastore determines a plurality of variables which affect the electrical transfer capabilities. A resource manager, connected to the processor, allocates resources by optimizing and correlating the electrical transfer capabilities with the plurality of variables, to generate an electrical transfer capacity rating for the one or more electric power facilities as a function of time duration and at any given point in time.

20 Claims, 17 Drawing Sheets

(56) References Cited

U.S. PATENT DOCUMENTS

2009/0281674 A1* 11/2009 Taft ..................... G01D 4/002
    700/286
2010/0114392 A1* 5/2010 Lancaster ............. G01R 21/06
    700/292

OTHER PUBLICATIONS

Ren et al., Design and Calculation Method for Dynamic Increasing Transmission Line Capacity, WSEAS Transactions on Circuits and Systems, vol. 7, Issues 5, May 2008.

* cited by examiner

FIG. 14

ELECTRICAL TRANSFER CAPACITY OPTIMIZATION SYSTEMS AND METHODS THEREOF

CROSS-REFERENCE TO RELATED APPLICATIONS

This application is a Continuation-In-Part of U.S. non provisional application Ser. No. 13/073,333 filed Mar. 28, 2011. All recited applications are incorporated herein by reference in their entirety and priority is date is claimed under those applications.

FIELD OF THE INVENTION

The invention relates generally to a system and method of computing and optimizing electric loading transfer capabilities, and more specifically, to a computer system capable of generating real-time electric transfer capacity ratings for one or more electric power facilities.

BACKGROUND OF THE INVENTION

With the electric industry's transition from a traditional rate-based regulation towards a deregulated energy marketplace, electricity consumers now have the ability to select their electricity services from various energy suppliers. Under the deregulated scheme, the transmission of bulk electric power continues to be regulated—by the Federal Energy Regulatory Commission (FERC), the North American Electric Reliability Corporation (NERC), and Regional Transmission Operators (RTO)—and remains the responsibility of local utility companies. This restructuring of the energy marketplace allows for consumers to have their electricity produced, transported and delivered from more than one provider. By supplying consumers with increased options for procuring their electricity needs, energy deregulation aims to improve reliability of the electric power system, serve increasing electricity demands, foster market competition, and thus lower the price of electricity.

The competition has affected how energy suppliers generate, transmit, and distribute electric power. For example, bulk power exchange between different electric-utility service areas has become more common today. There is an increased need to buy and sell electric power over longer distances. This transfer of power has placed greater demand and strain on existing generation and transmission facilities. As a result, many power grid regions have experienced power outages and curtailments. Potential causes for the power outages include unexpected energy demand spikes, unreliable electric power systems, and overtaxed electric transmission lines and substation components.

In order to meet the everyday demands for electricity and for the facilities used the transfer of bulk electric power are reliable and secure, the FERC, NERC and RTO's have developed reliability standards and rules for market participants that focus on energy planning, and facility design, management and operation. Moreover, energy planning and management helps with the increasingly complicated energy transactions, involving generation of bulk electric power from multiple suppliers, swapping electric power on the national grid, and sharing of regional transmission lines.

Consequently, it is desirable to introduce a method and system that can address the prior art's shortcomings while providing optimized energy transmission through asset planning and management during operations. It would also be desirable to have such a system that can accurately simulate and dynamically compute the electric transfer capacity ratings (also known as facility ratings, thermal ratings, or load capability), accounting for a plurality of variable factors including ambient weather conditions and material construction characteristics of components used in facilities that comprise electric power distribution, generation and transmission systems.

SUMMARY OF THE INVENTION

Accordingly, the shortcomings of the prior art are overcome and additional advantages are provided through the provision of a method and related system for optimizing electric loading transfer capabilities. In one embodiment, the system comprises a processor which receives and stores information regarding resources of one or more electric power facilities. The system also includes a capability datastore and an external factors datastore, both of which communicate with the processor and with each other. The capability datastore determines electrical transfer capabilities of the resources as a function of time duration and at any given point in time. The external factors datastore determines a plurality of variables which affect the electrical transfer capabilities. The system further comprises a resource manager, which is in processing communication with the processor, the capability datastore, and the external factors datastore. The resource manager allocates the plurality of resources by optimizing the electrical transfer capabilities as a function of time duration and at a given point in time and by correlating the plurality of variables with the electrical transfer capabilities in order to generate electric capacity ratings for one or more electric power facilities as a function of time duration and at any given point in time.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 14 is an exemplary view of a graphical user interface such as provided by embodiment of FIG. 6 having a thermal ratings window showing an itemized list of electric transfer capacity ratings as a function of time duration for each individual resource present in one or more electric power facilities;

DETAILED DESCRIPTION OF THE INVENTION

FIGS. 1-16 provide an electric transfer capacity rating model, wherein the model reflects the relationships between electrical transfer capabilities of resources present in one or more electric power facilities and external factors, such as weather parameters, and material and construction characteristics of components used in electric power facilities which affect the electrical transfer capabilities as a function of time duration. The model can be repeatedly updated and used to calculate the electric capacity rating as a function of time duration of the one or more electric power facilities. In order to effect repeated calculations, a plurality of variables representing the external factors are continuously measured or sampled and the electrical transfer capabilities as a function of time duration are automatically updated. Thereafter, the model is evaluated with the above updated or tuned parameters. The model may be updated without excessive computational efforts as frequently as desired, resulting in electric capacity ratings of the one or more electric power facilities.

While described below in a single computer environment, the system and method for calculating electric transfer capacity ratings of one or more electric power facilities can be implemented in a networked computing arrangement in which a number of computing devices communicate over a local area network (LAN) or over a wide area network (WAN). Such an environment can include large scale wireless communications between a host computer and several portable computer terminals, including weather monitoring equipment and global positioning system units located onsite where the physical resources or electrical equipment of the one or more electric power facilities are positioned.

Figure 1:
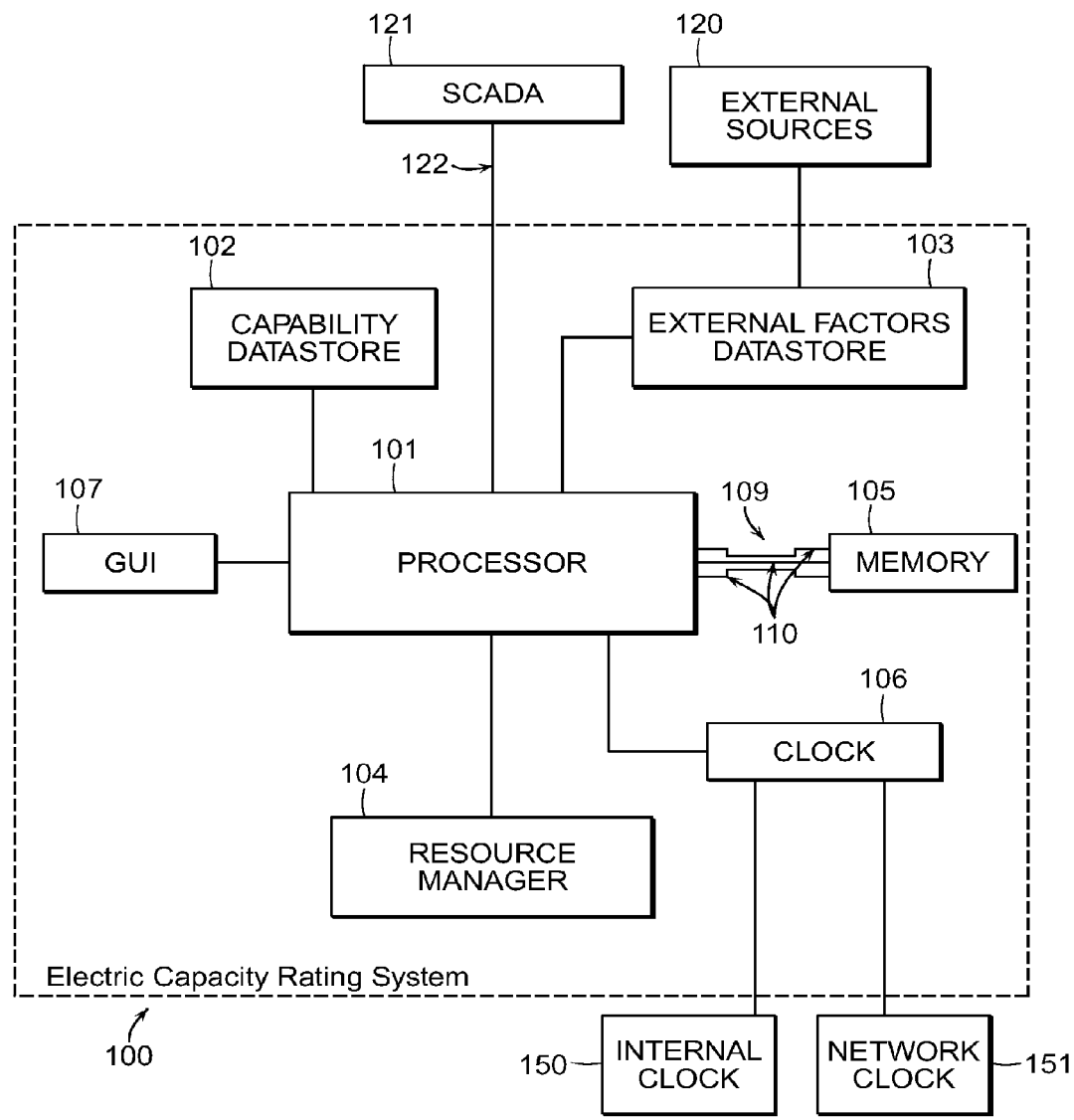
FIG. 1 is a block diagram illustrating the overall system structure as per one embodiment of the present invention, showing connectivity among the system modules.

FIG. 1 is a block diagram illustrating one embodiment of the present invention. An electric capacity rating system 100 includes at least one processor 101 and a plurality of modules 102, 103, 104, 105, 106, all in processing communication with one another. The processor 101 serves to receive and store information regarding the resources present in one or more electric power facilities. The resources contained within an electric power facility include overhead line conductors as well as other electric generation, distribution, and transmission components. Note, in one embodiment of the present invention, the modules 102, 103, 104, 105, 106 are part of the processor 101 and thus constitute units established internally within the processor 101. As will be appreciated by those skilled in the art, in an alternate embodiment, any of the modules 102, 103, 104, 105, 106 may form individual units established separate from the processor 101.

In one embodiment, a capability datastore is provided as shown and referenced by numeral 102. The capability datastore 102 determines the electrical transfer capabilities of each individual resource at any given point in time. Generally, the electrical transfer capabilities comprise one or more electric transmission, distribution, or generation transfer capabilities. More specifically, the electrical transfer capabilities of a resource represent the capacity of the resource to transfer electric power as a function of time duration and at any given point in. The capacity is often defined as the maximum allowable current, or the highest ampacity, at which the resource can be operated for a given time duration without violating safety codes or the integrity of the resource.

An external factors datastore is also provided as shown and referenced by numeral 103. The external factors datastore 103 maintains a collection of variables, which affect the electrical transfer capabilities of each resource as a function of time, and communicates the collection of variables to the processor 101 at any given point in time in order to update the electrical transfer capabilities. Furthermore, a resource manager, shown and referenced as numeral 104, connects to the processor 101 to perform a majority of the processing functions of the electric capacity rating system 100. Specifically, the resource manager 104 allocates the plurality of resources by optimizing the defined electrical transfer capabilities. In turn, the resource manager 104 correlates the plurality of variables with the electrical transfer capabilities in order to generate an electric capacity rating as a function of time duration for one or more electric power facilities being analyzed.

In one embodiment, a clock, as shown and referenced by numeral 106, is coupled to processor 101 and provides a clock signal for electric transfer capacity rating system 100. Clock 106, in turn, provides time and date information to the processor 101 as well as the capability datastore 102, the external factors datastore 103, and the resource manager 104. In one embodiment, system 100 reads an internal clock from a host computer 150 and updates the clock 106. In another embodiment, a network clock 151 is used to update clock 106. As will be appreciated by those skilled in the art, the use of a clock can be substituted or omitted in alternate embodiments.

Figure 2:
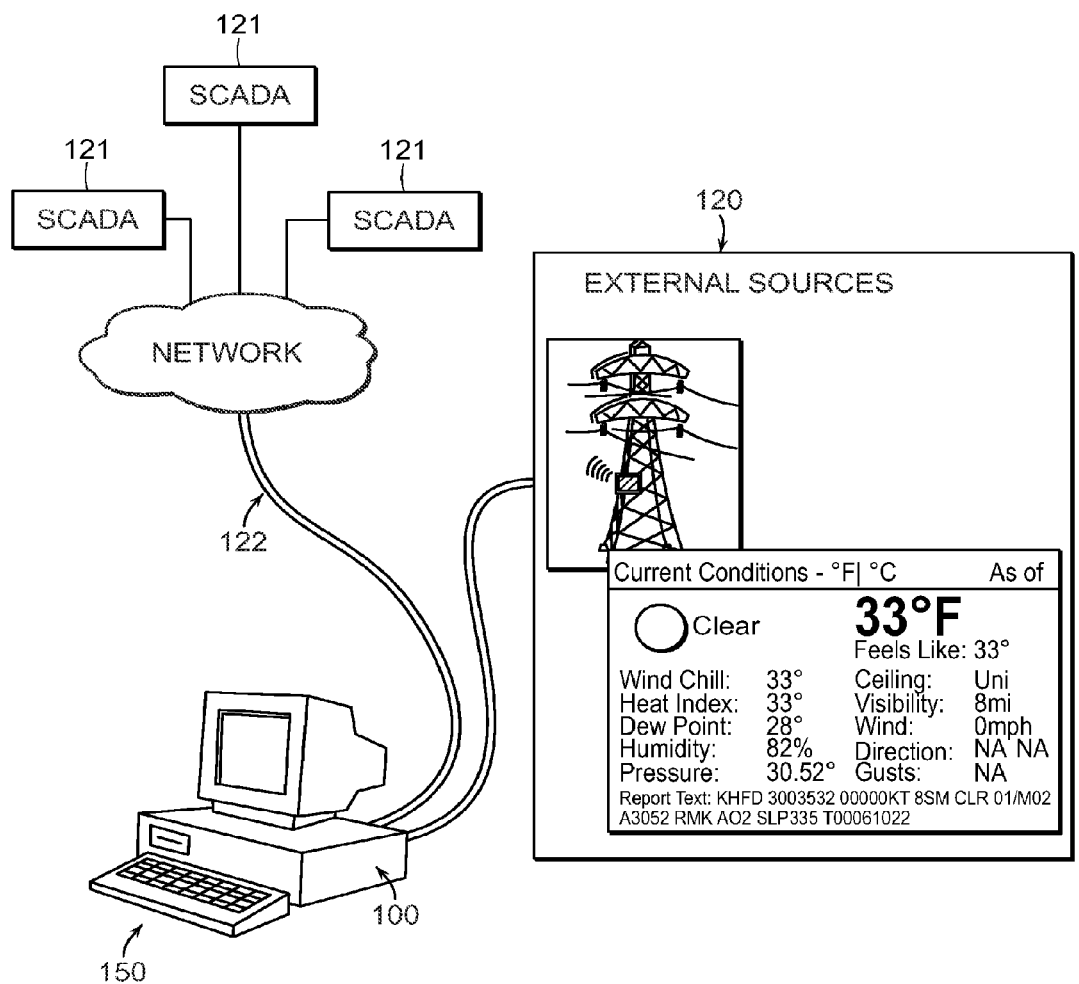
FIG. 2 is an illustration of a networked environment as per embodiment of FIG. 1.

The system 100 also has a memory unit, as shown and referenced by numeral 105 in FIG. 1, wherein the processor 101 can read and write compiled data. The memory unit 105 can be contained within the processor 101, as shown in FIG. 2. As such, the memory unit 105 is internal memory integrated with the processor 101. Alternatively, the memory unit 105 can be external memory, which can be remotely accessible by the processor 101.

Figure 3:
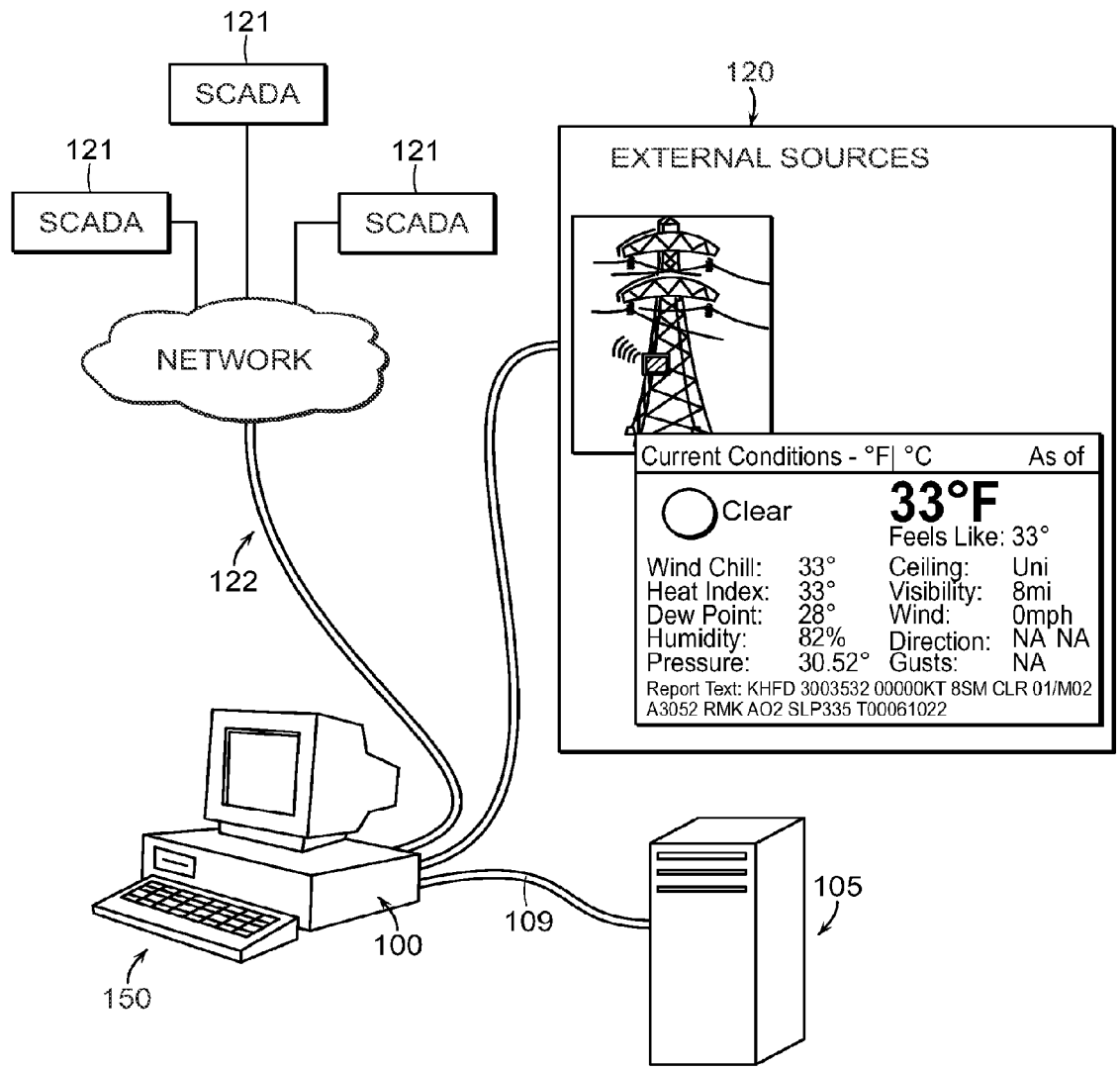
FIG. 3 is another illustration of a networked environment showing processing communication with an external memory and other external sources as per embodiment of FIG. 1.

FIG. 3 illustrates one embodiment of the present invention having an external memory unit 105 embedded in a large computer such as a server. The connection between the processor 101 and the memory unit 105, regardless if internal or external, comprises at least one data port interface 109. The data port interface 109 provides the means for supporting a plurality of independent communication channels 110 (as shown in FIG. 1), which act in cooperation with each other and with the processor 101 and memory unit 105.

The compiled data that is saved in the memory unit 105 includes information about: (i) the plurality of resources; (ii) the electrical transfer capabilities determined by the capability datastore 102; and (iii) the plurality of variables ascertained by the external factors datastore 103. In addition to providing storage for the compiled data, the memory unit 105 offers various tiers of information technology security. This plurality of security levels accommodates the different standards of conduct to be observed between regulated and unregulated groups (i.e. transmission providers and all their energy affiliates, independent system operators, regional transmission organizations) within the one or more electric power facilities. An example of a standard of conduct can be the Standards of Conduct and Audits defined by the Federal Energy Regulatory Commission. However, the memory unit 105 maintains the flexibility to provide different levels of security to meet any standards of conduct enforced by any agency, commission, or party.

Figure 4:
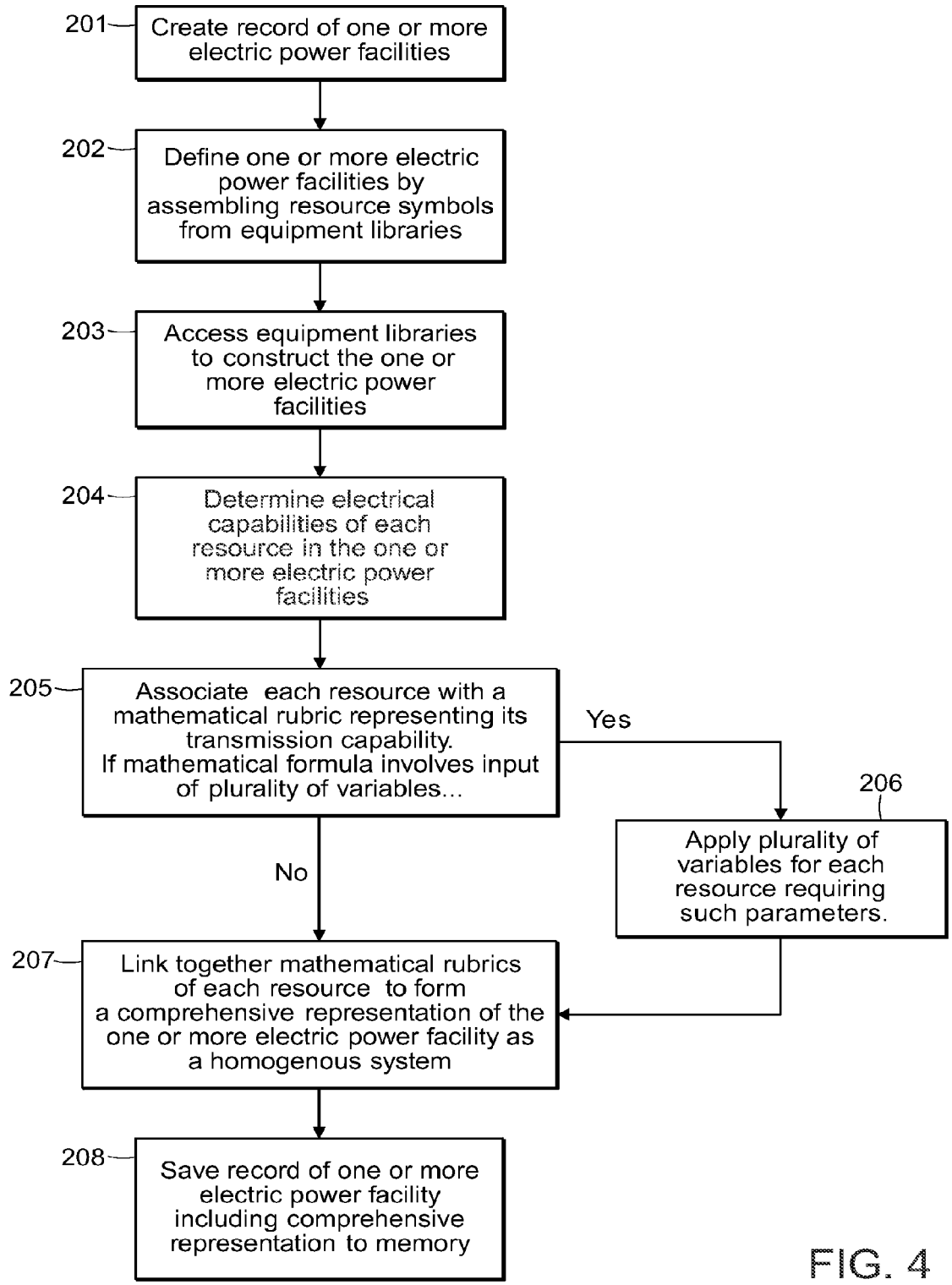
FIG. 4 is a flow chart illustration as per embodiment of FIG. 1 showing the design of a virtual model of one or more electric power facilities.

FIG. 4 is a flow chart illustrating the electric transfer capacity rating system 100 of an embodiment of the present invention as it initiates the process of optimizing the electric loading transfer capabilities as a function of time duration of the one or more electric power facilities. Specifically, the system 100 provides the means to design a virtual model of the one or more electric power facilities to be analyzed. In step 201, the processor 101 allows a system user to create a record in which to build the virtual model of said one or more electric power facilities. The processor 101, in step 202, provides a means to construct the virtual model by assembling symbols which represent the plurality of resources present in the electric power facilities. The plurality of resources can include any combination of electric generation, distribution and transmission components, as well as the components material and construction characteristics. Some examples of electric generation, distribution, and transmission components are overhead line conductors, underground cables, conductor splices, conductor compression terminals, buses, disconnects, wave traps, current limiting reactors, circuit breakers, circuit switches, current transformers, series capacitors, shunt capacitors, substations, and relays. In step 203, the processor 101 accesses equipment libraries in order to retrieve the resource symbols needed to create the virtual model.

Once the virtual model has been constructed, the system 100 proceeds with step 204, wherein the capability datastore 102 provides information on the electrical transfer capabilities of each of the plurality of resources present in the one or more electric power facilities. The information pertaining to electrical capabilities can include resource equipment properties, resource composition, resource construction, and resource thermal limits. Other information not mentioned above can also be selectively provided as will be appreciated by those skilled in the art.

In step 205, the processor 101 receives the electrical transfer capabilities from the capability datastore 102, and directs the resource manager 104 to develop and associate a mathematical rubric, including one or more formulas or algorithms, with each of the plurality of resources. If the mathematical rubrics do not require input of a plurality of variables, the resource manager proceeds to step 207. However, if the mathematical rubrics require quantities for a plurality of variables, the processor 101 in step 206 requests such information from the external factors datastore 103. The plurality of variables provided by the external factors datastore 103 includes important weather parameters, such as ambient temperature, wind speed, and wind direction. Other weather parameters, such clarity of atmosphere, solar radiation, air density, air viscosity, and air thermal conductivity, may also be included. The plurality of variables also comprise non-weather-related parameters, such as geographic position and elevation above sea level of said one or more electric power facilities, orientation of said plurality of resources, time of day, day of year, seasonal period, as well as the properties, physical dimensions and types of materials used in the construction of plurality of variables.

Before the external factors datastore 103 sends the plurality of variables to processor 101, the plurality of variables are updated either dynamically by external sources 120 or manually by user input. Specifically, with respect to updating weather parameters, the external sources 120 may comprise a meteorological institute. Supervisory Command and Data Acquisition (SCADA) systems 121 and other remote access systems may also provide the necessary data to update the plurality of variables. Alternatively, weather measurement sensors placed near the locations of the resources can also serve as the external sources 120. Furthermore, if dynamic updates from external sources 120 or manual updates are not available, the external factors datastore 103 can define the plurality of variables using old values previously saved in the memory unit 105.

Continuing in step 206, the resource manager 104 applies the plurality of variables to the mathematical rubrics. After the mathematical rubrics have been populated with the plurality of variables, the resource manager 104 proceeds with step 207, wherein the manager 104 links together the mathematical rubrics of the plurality of resources. As a result of the linking, the manager 104 forms a comprehensive representation, which characterizes the one or more electric power facilities as a single, homogenous system. In step 208, the processor 101 saves the record of the one or more electric power facilities, including the comprehensive representation and compiled data, to the memory unit 105. This record can later be retrieved for future observation, modification, or analysis of electric capacity rating of the one or more electric power facilities.

Figure 5:
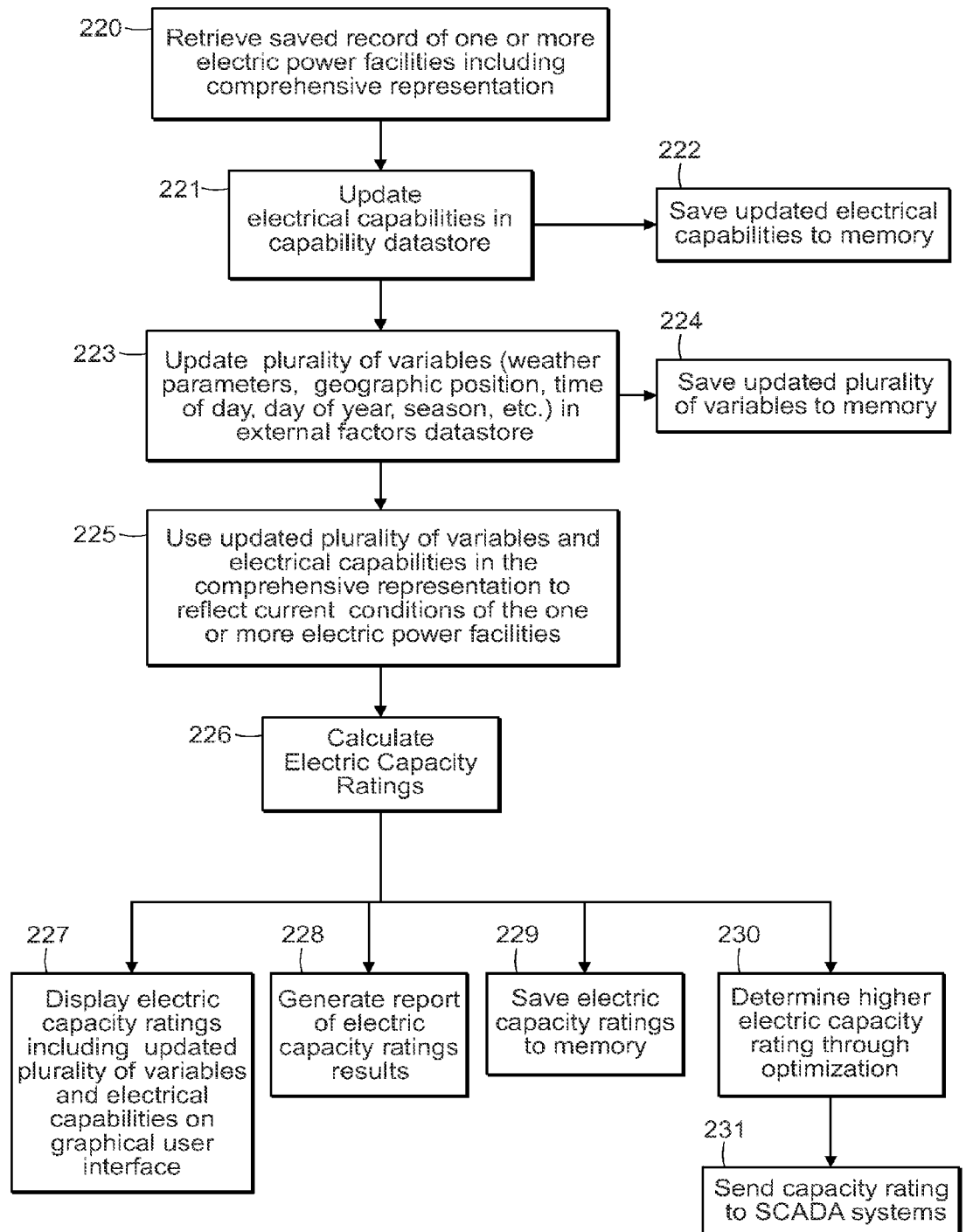
FIG. 5 is a flow chart illustration as per embodiment of FIG. 1 showing the calculation of an electric capacity rating of the one or more electric power facilities.

FIG. 5 is a flow chart illustrating the electric transfer capacity rating system 100 of an embodiment of the present invention as it computes the electric transfer capacity rating as a function of time duration of the one or more electric power facilities. In step 220, the processor 101 retrieves the record of the one or more electric power facilities, including the comprehensive representation, from the memory unit 105. Subsequently, in steps 221 and 223, the capability datastore 102 updates the electrical transfer capabilities, and the external factors datastore 103 updates the plurality of variables, respectively. Since weather conditions can change within short periods of time and have a significant effect on electric transfer capacity ratings, it is particularly important that weather parameters are updated. The updated plurality of variables and electrical transfer capabilities are then saved to the memory unit 105 in steps 222 and 224. In order to reflect the current conditions of the one or more electric power facilities, the processor 101 in step 225 directs the resource manger 104 to implement the updated plurality of variables and electrical transfer capabilities into the comprehensive representation. Afterwards, the resource manager 104 uses the comprehensive representation to calculate the electric transfer capacity ratings as a function of time duration of the one or more electric power facilities, as shown in step 226.

In steps 227-229, the processor 101 displays the electric transfer capacity ratings and compiled data (i.e. plurality of resources, electrical capabilities, and plurality of variables) in a graphical user interface 107, generates a report documenting the above information, and saves the above information into the memory unit 105. Finally, in step 230, the resource manager 104 performs optimization of the electric transfer capacity rating. For instance, the resource manager 104 achieves a higher transfer capacity rating by optimizing the electrical transfer capabilities with the plurality of resources given updated plurality of variables. In turn, the electric transfer capacity rating can be used temporarily by operators of the one or more electric power facilities to distribute or transmit more electricity for a given time duration more effectively and efficiently. As shown in step 231, the processor 101 sends the electric transfer capacity ratings through at least one peripheral link 122 to a network of Supervisory Command and Data Acquisition (SCADA) systems 121 (as shown in FIGS. 1-3). This allows the processor 101 to interpret and manipulate real-time alarms of the SCADA systems 121, thus reducing the need for drastic actions, such as shedding electric loads or transferring electric loads from one electric power facility to another.

Figure 6:
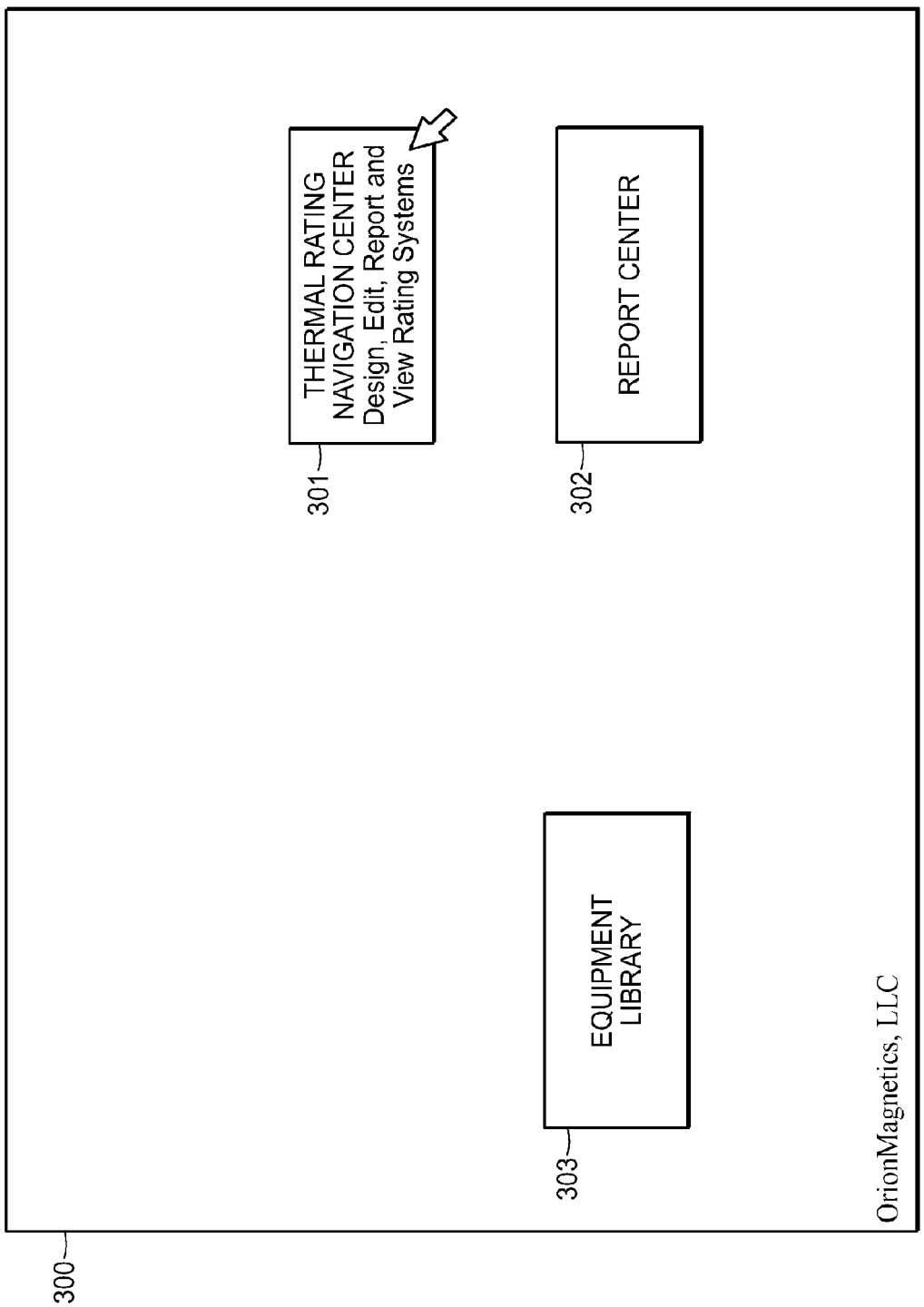
FIG. 6 is an exemplary view of an initial startup window of a graphical user interface as per one embodiment of the present invention.

FIGS. 6-16 provide different views of the graphical user interface (GUI) 107 of the electric transfer capacity rating system 100. FIG. 6 is an exemplary view of an initial startup window 301 of the GUI 107 for enabling a user to easily navigate through and perform a desired task in the system 100. The initial startup window 300 displays icons representing various application windows of the system 100. For example, the user may select icon 301 to gain access to the thermal rating navigation window where the user can begin the process of optimizing the electric loading transfer capabilities of the one or more electric power facilities, as designated in steps 201-208, 220-231. When icon 302 is selected, the user is directed to the report center window where the user can view, generate, and disseminate reports regarding analysis of electric transfer capacity ratings previously conducted. The user may select icon 303 to gain access to the equipment library window, which allows the user to view symbols representing resources that can be used to assemble a virtual model of the one or more electric power facilities.

Figure 7:
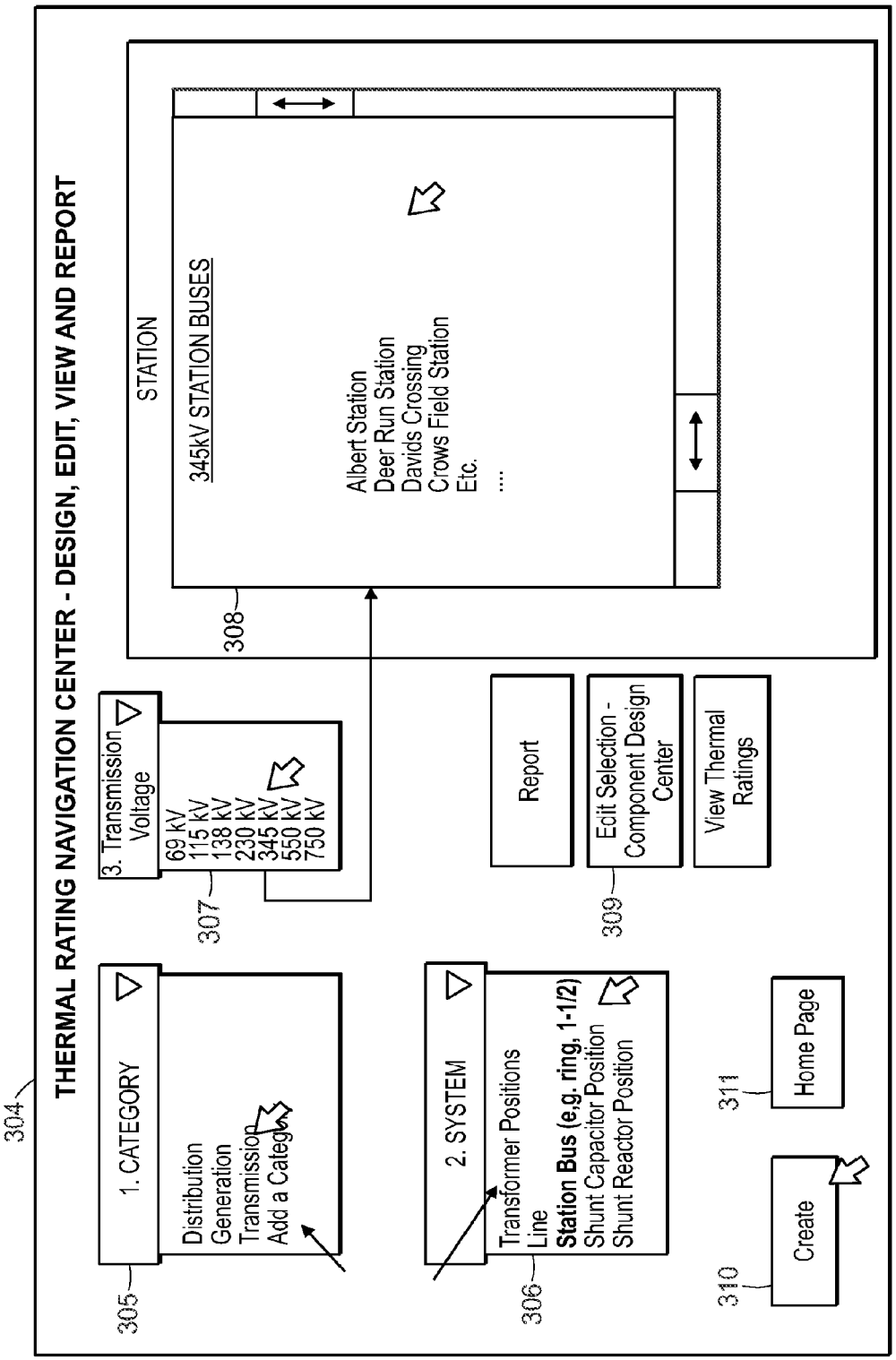
FIG. 7 is an exemplary view of the graphical user interface such as provided by embodiment of FIG. 6 illustrating a thermal rating navigation window for allowing a user to create, modify, display, or print information relating to energy needs.

As shown in FIG. 7, the GUI 107 displays a thermal rating navigation window 304 after the user has selected icon 301 from the initial startup window 300. The thermal rating navigation window 304 maintains various panels and buttons in which the user may manipulate to design or edit a virtual model of the one or more electric power facilities, to view or optimize the electric loading transfer capabilities of the one or more electric power facilities, or to generate a report of the electric loading transfer capabilities as a function of time of the one or more electric power facilities.

Category panel 305 is a listing of options representing various types of electric power facilities. The category panel 305 typically shows a "Distribution" option representing an electric power distribution facility, a "Generation" option representing an electric power generation facility, and a "Transmission" option representing an electric power transmission facility. In addition, an option labeled "Add a Category" is included in the listing of options to allow the user to load and select other categories of an electric power facility.

Once the user selects an option in category panel 305, system panel 306 displays a list of electric power facilities identified under the chosen category. In this example, the user selected the "Transmission" option in category panel 305. As a result, the system panel 306 shows different systems of electric power transmission facilities (i.e. "Transformer Positions", "Line", "Station Bus", "Shunt Capacitor Position", "Shunt Reactor Position"). In a similar manner, voltage panel 307 becomes populated with various voltage ratings once the user chooses a particular system of electric power facility in the system panel 306. Each rating displayed in voltage panel 307 represents a voltage in which the selected electric power facility may be rated. In this example, the user selected the "Station Bus" electric power facility in system panel 306, and as a result, voltage panel 307 displays multiple voltage ratings. Once the user selects a specific voltage rating, query panel 308 lists records saved in memory 105 which reflect the user-selected combination of category, system, and voltage rating. The user may then choose any one of the listed records of electric power facilities to view or edit.

The thermal rating navigation window 304 also provides several command buttons to initiate different actions by the electric capacity rating system 100. After making selections in category panel 305, system panel 306, and voltage panel 307 and choosing a record in query panel 308, the user may modify the virtual model (of the one or more electric power facilities) saved within that record by selecting the edit button 309. Alternatively, if the user wants to construct a new virtual model (and thus new record), the user may select the create button 310, as shown in FIG. 7. Moreover, the user need only select the homepage button 311 to return to the initial startup window 300.

Figure 8:
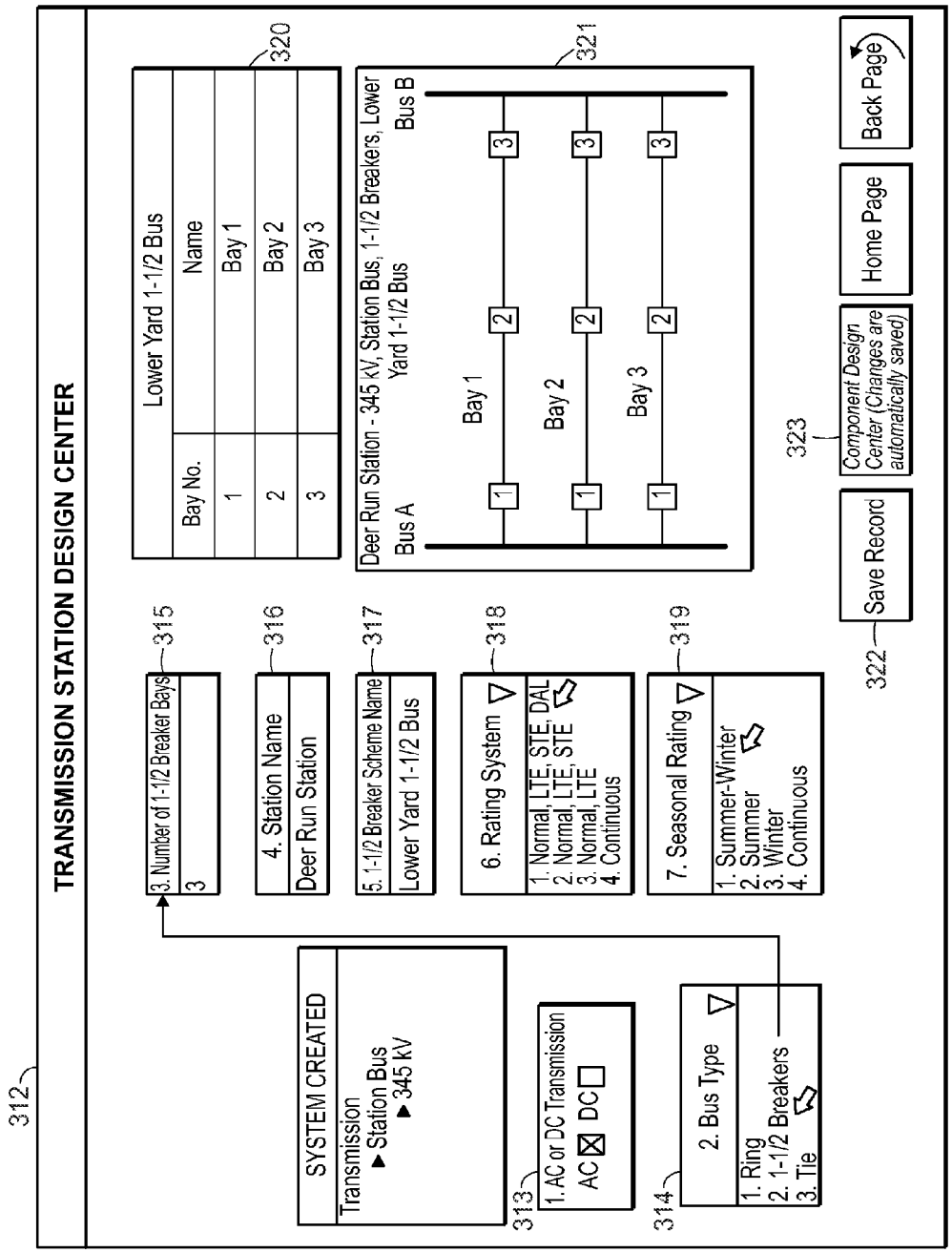
FIG. 8 is an exemplary view of the graphical user interface such as provided by embodiment of FIG. 6 showing a power facility design window for building and configuring a transmission station present in one or more electric power facilities.

Following the selection of the create button 310, the GUI107 displays a power facility design window 312, as illustrated in FIG. 8. More specifically, based on the selections the user made in the thermal rating navigation window 304, the power facility design window 312 will display various panels which will enable the user to begin the design process reflected in steps 201, 202, 203. In this example, the user chose to create a 345 kV transmission station bus. As a result, several configuration panels are provided for the user to manipulate to define specific features of the transmission station bus. In a current type panel 313, the user is able to choose whether the flow of electricity is alternating current (AC) or direct current (DC). A class panel 314 allows the user to specify the type of transmission station bus is being created. In this example, because the user selected "1½ breakers" as the bus type, a bays panel 315 is provided for the user to identify the number of 1½ breaker bays present in the transmission station bus. In station name panel 316 and scheme name panel 317, the user can enter names with which to identify the current record of the one or more electric power facilities being created. A rating system panel 318 and a seasonal rating panel 319 allow the user to indicate a precise rating arrangement for the transmission station bus. The power facility design window 312 also shows a tabular display 320 and graphical image 321 representative of the one or more electric power facilities according to the user's specifications. For example, since the user specified three breaker bays for the transmissions station bus, the tabular display 320 shows three entries for each bay while the graphical image 321 shows a line representation of a transmission station bus having a "Bus A" and a "Bus B" connected via three breaker bays.

Figure 9:
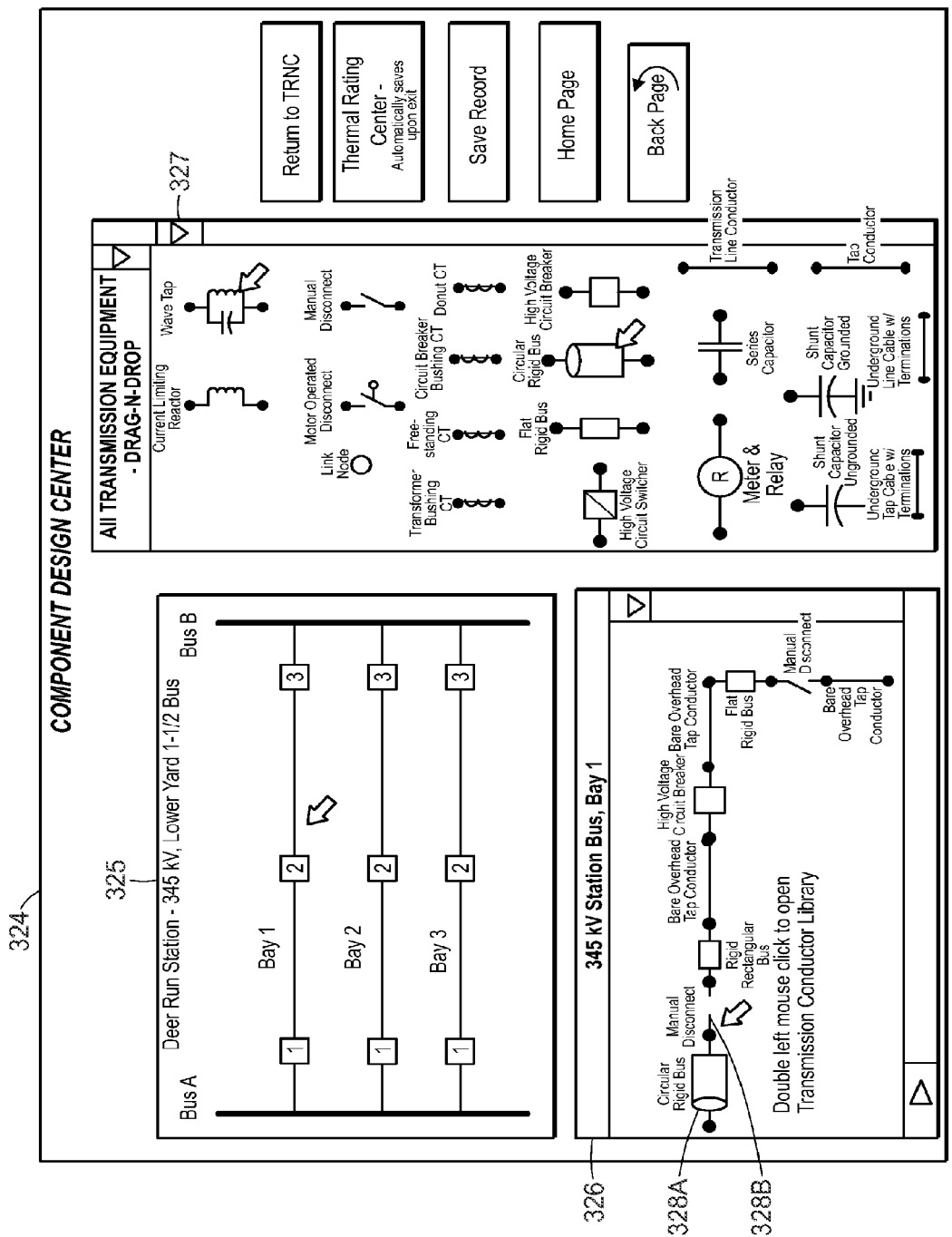
FIG. 9 is an exemplary view of the graphical user interface such as provided by embodiment of FIG. 6 having a component design window showing resources or electrical equipment that can be used to assemble a virtual model of one or more electric power facilities.

Command buttons are also provided in the power facility design window 312 to allow the user to navigate to other application windows or to perform designated functions. In particular, a save record button 322 is provided for the user to save the record of the one or more electric power facilities being created. The user may also select a component design button 323 which also saves the record and subsequently directs the user to a component design window 324, as illustrated in FIG. 9.

In the component design window 324, the user can build in detail an exact combination and sequence of resources present in the one or more electric power facilities. The component design window 324 comprises of three main panels: a graphical display panel 325, a workspace panel 326, and an equipment library panel 327. Within the graphical display panel 325, the user can see a line representation of the one or more electric power facilities. Moreover, the user can highlight a specific portion of the line representation to begin the design process. To start designing the one or more electric power facilities, the user first refers to the equipment library panel 327, where various symbols representing electric power facility resources (i.e. equipment) are listed. Once the user finds a resource to be utilized in the building of the highlighted portion of the electric power facility, the user selects the symbol and drag-and-drops the symbol inside the workspace panel 326. The user executes the same maneuver for the other resources to be utilized in building the highlighted portion of the electric power facility. Within the workspace panel 326, the user can then connect the resource symbols in any particular sequence.

Figure 10:
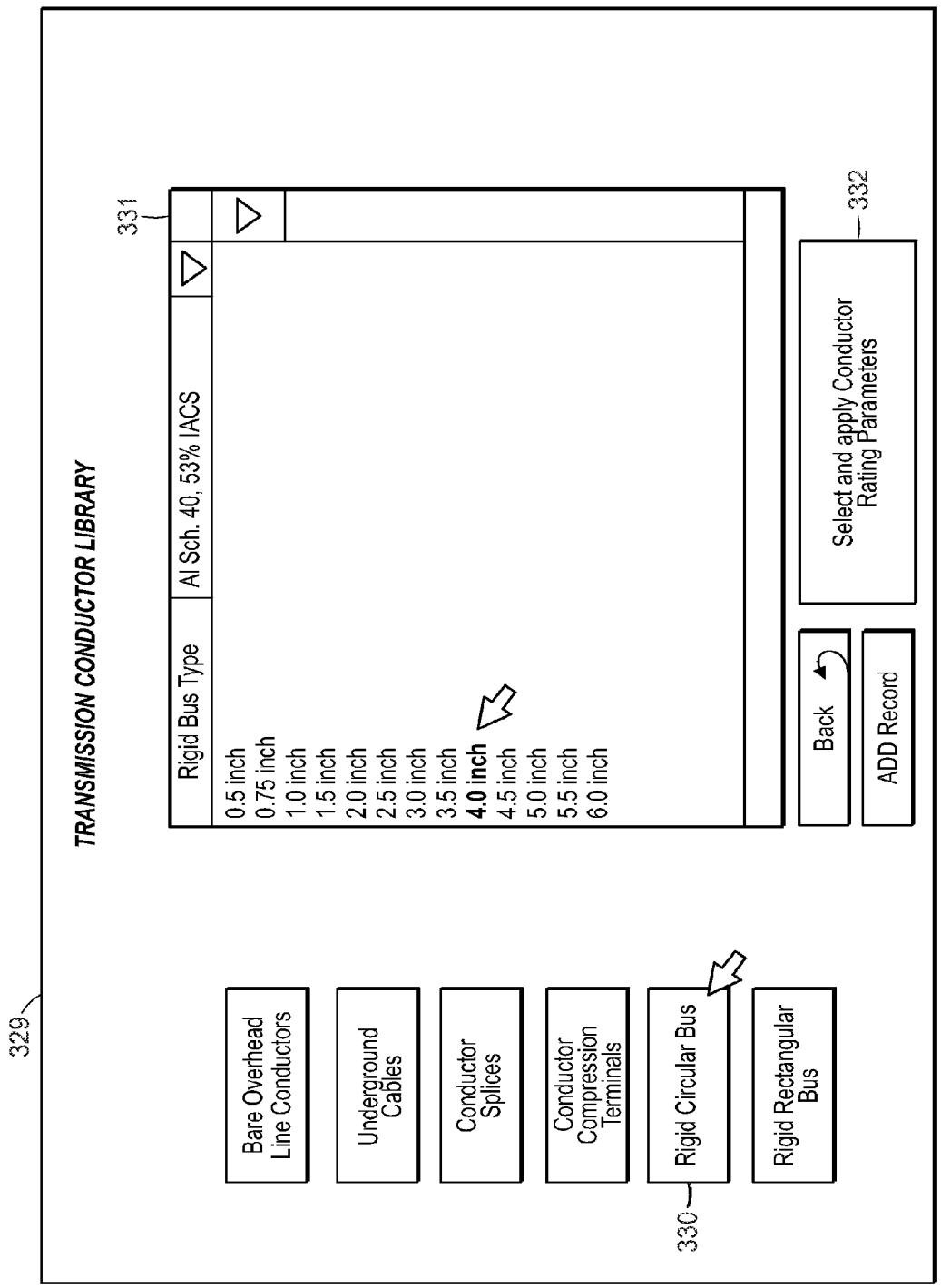
FIG. 10 is an exemplary view of a graphical user interface such as provided by embodiment of FIG. 6 showing an equipment library window for specifying properties of a resource, such as an electrical bus.

Furthermore, within the workspace panel 326, the user can double-click on any one of the symbols to view and modify the properties of that resource. In this example, the user double-clicks on symbol 328A labeled "Circular Rigid Bus." As a result, an equipment library window 329, as shown in FIG. 10, displays on the GUI 107. The equipment library window 329 provides various command buttons and panels for the user to manipulate in order to specify properties and materials of the selected resource. In this example, when the user selected a command button 330 labeled "Rigid Circular Bus," a properties panel 331 appears. Within the properties panel 331, the user can identify the specifications of the rigid bus to be used by selecting any one of the choices that are.

Figure 11:
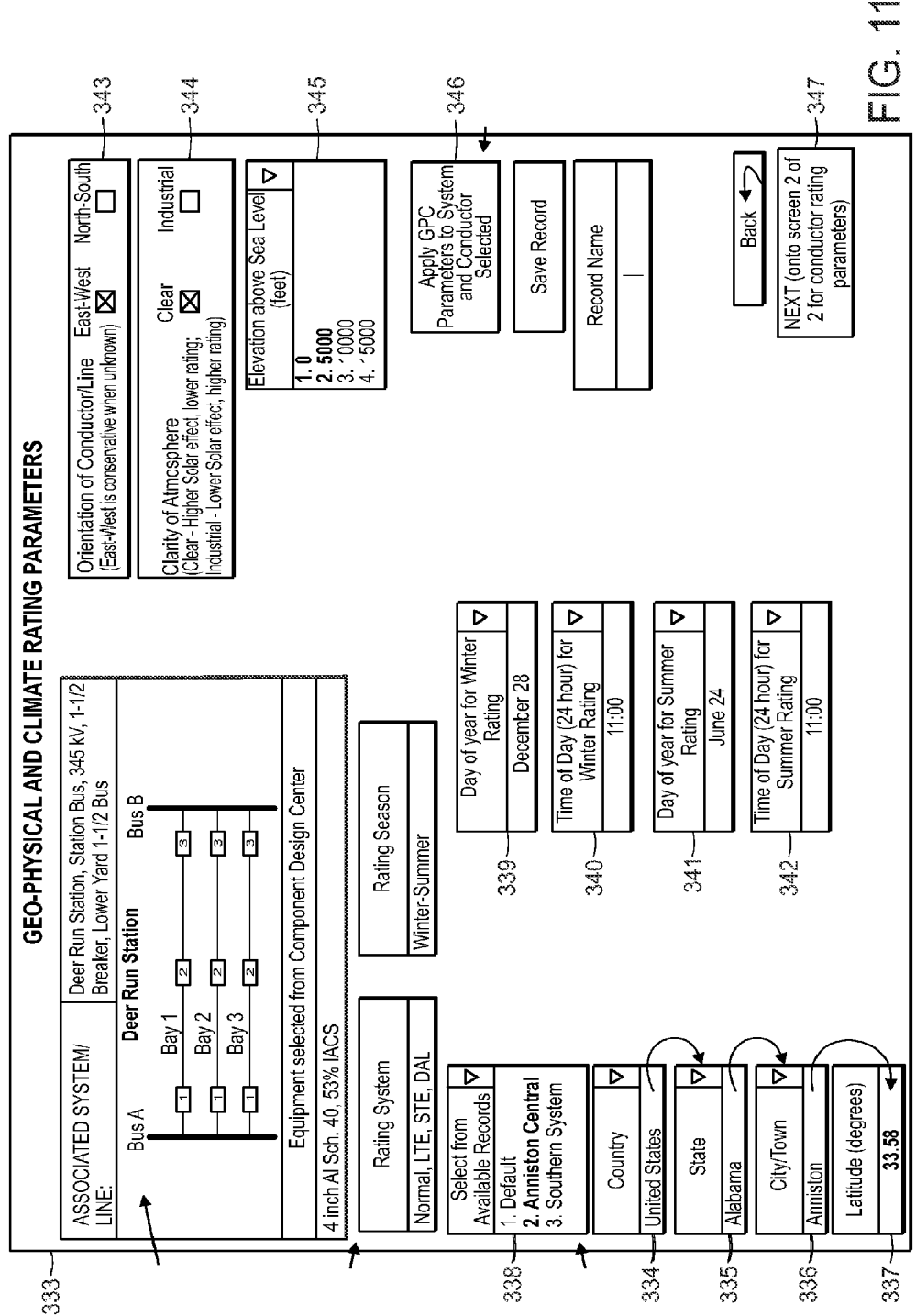
FIG. 11 is an exemplary view of a graphical user interface such as provided by embodiment of FIG. 6 having a rating parameters window wherein a plurality of variables can be defined.

Once a selection has been made, the user must apply additional parameters for the resource (i.e. rigid circular bus) by selecting an apply parameters button 332. In selecting the apply parameters button 332, the user navigates to a rating parameters window 333, as illustrated in FIG. 11. The rating parameters window 333 allows the user to establish the geophysical location of the resource and climate parameters associated with the resource. Using location panels 334, 335, 336, 337, the user can indicate the country, state, city, and latitude in which the resource is located. Alternatively, the user may choose from a location panel 338 a location record previously saved. By choosing a location record, such as "Anniston Central" in this example, the location panels 334, 335, 336, 337 become automatically set.

The rating parameters window 333 provides date-time panels to specify the time period in which electric transfer capacity ratings are to be calculated. In this example, since a "winter-summer" seasonal rating was selected in the seasonal rating panel 319 of the power facility design window 312 (FIG. 8), the rating parameters window 333 shows four date-time panels 339, 340, 341, 342 to configure the dates and times when a summer rating and a winter rating are to be determined, and also to define the time durations for individual rating periods within the summer and winter seasons. Furthermore, an orientation panel 343, atmosphere panel 344, and elevation panel 345 allow the user to specify the orientation of the resource, the clarity of the atmosphere, and the elevation above sea level of the resource, respectively.

Figure 12:
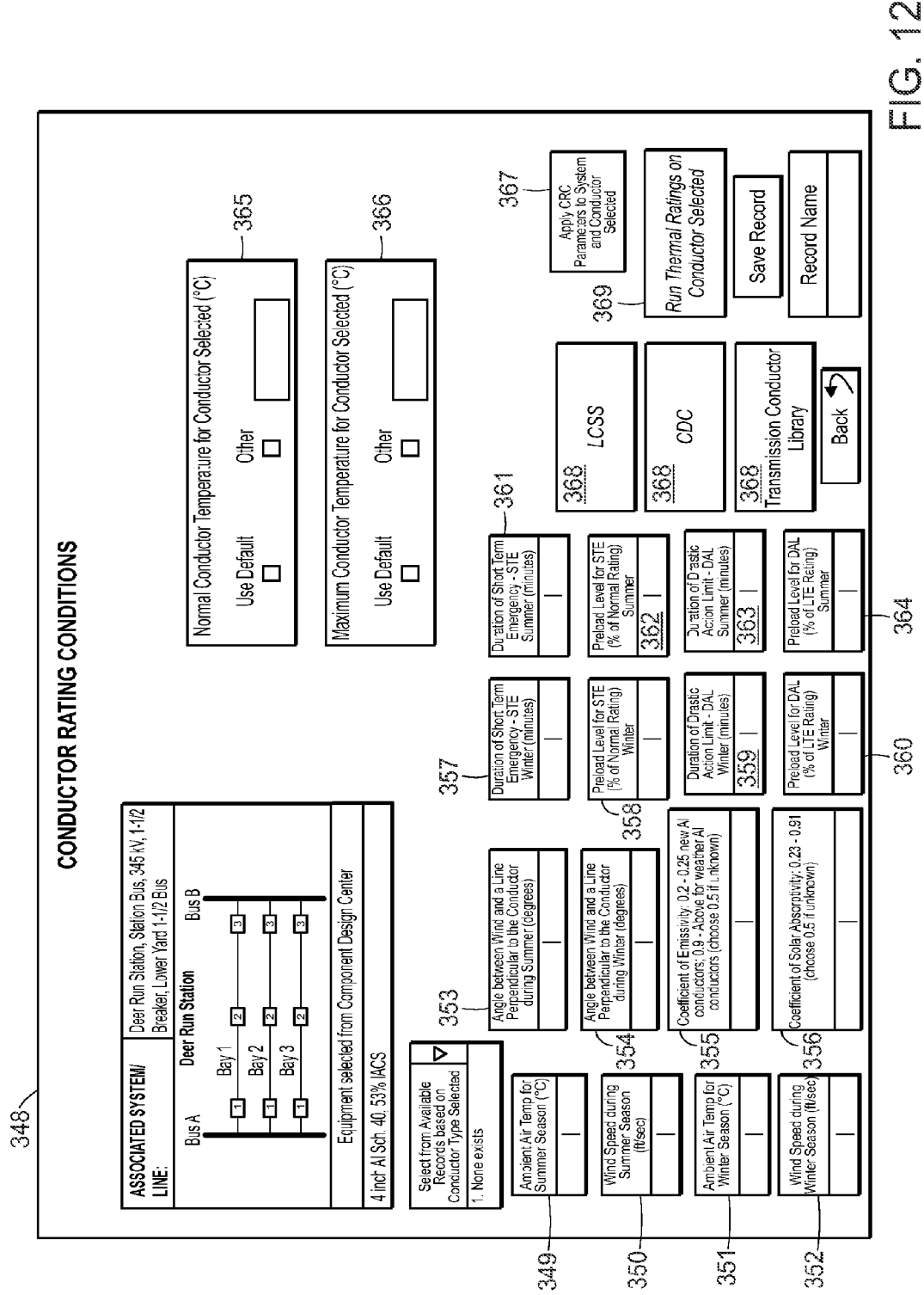
FIG. 12 is an exemplary view of a graphical user interface such as provided by embodiment of FIG. 6 having a conductor rating conditions window wherein a plurality of variables regarding conductor conditions and construction characteristics can be defined.

After the user has specified the geophysical and climate rating parameters, the user can select an apply gpc button 346 which will apply these parameters to the resource and subsequently direct the user to a conductor rating conditions window 348, as shown in FIG. 12. If, however, the user prefers not to apply the geophysical and climate rating parameters, the user can select the next screen button 347 to navigate directly to the conduct rating conditions window 348.

In the conduct rating conditions window 348 of the GUI 107, the user can specify more detailed parameters for the selected resource (i.e. circular rigid bus). Depending on the selections made in the rating system panel 318 and the seasonal rating panel 319 of the power facility design window 312 (FIG. 8), a distinct set of atmospheric panels and emergency parameter panels will appear in the conduct rating conditions window 348. In this example, the user is given atmospheric panels 349-356 to indicate various atmospheric factors. In atmospheric panel 349, the user can input an ambient air temperature for the summer season. In atmospheric panel 350, the user can input a wind speed for the summer season. The user can also input an ambient air temperature and wind speed for the winter season in atmospheric panels 351, 352 respectively. In atmospheric panels 353, 354, 355, 356, the user can specify an angle between wind direction and the resource for each the summer and winter seasons, a coefficient of emissivity, and a coefficient of solar absorptivity. Furthermore, emergency parameter panels 357-364 are provided for the user to configure, for both winter and summer seasons, a short-term emergency time duration, a preload level for short-term emergency, a drastic action limit time duration, and a preload level for the drastic action limit. In resource temperature panels 365, 366, the user can either select a default value or input an express value for normal resource temperature and maximum resource temperature. To apply these parameters, the user must then select an apply ere button 367. Command buttons 368 are also provided to give the user the ability to quickly navigate to other application windows, such as the component design window 324 or the equipment library window 329.

Figure 13:
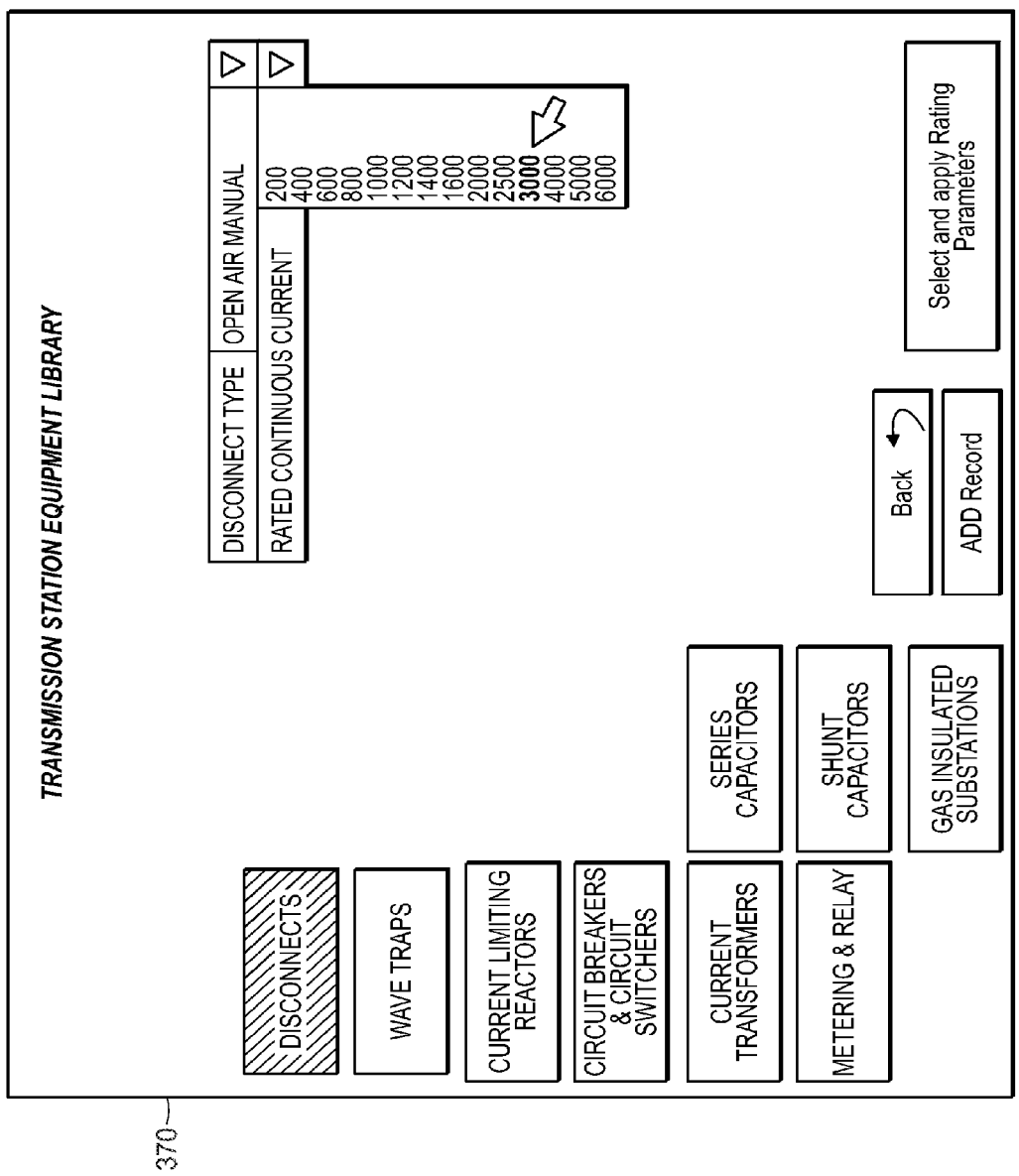
FIG. 13 is an exemplary view of a graphical user interface such as provided by embodiment of FIG. 6 showing an equipment library window for specifying properties of a resource, such as a manual disconnect.

FIG. 13 is another exemplary view of an equipment library window 370 after the user double-clicks on a symbol 328B labeled "Manual Disconnect" in the component design window 324 (FIG. 9). The equipment library window 370 provides various command buttons and panels for the user to manipulate in order to specify properties and materials of the selected resource.

Figure 14:
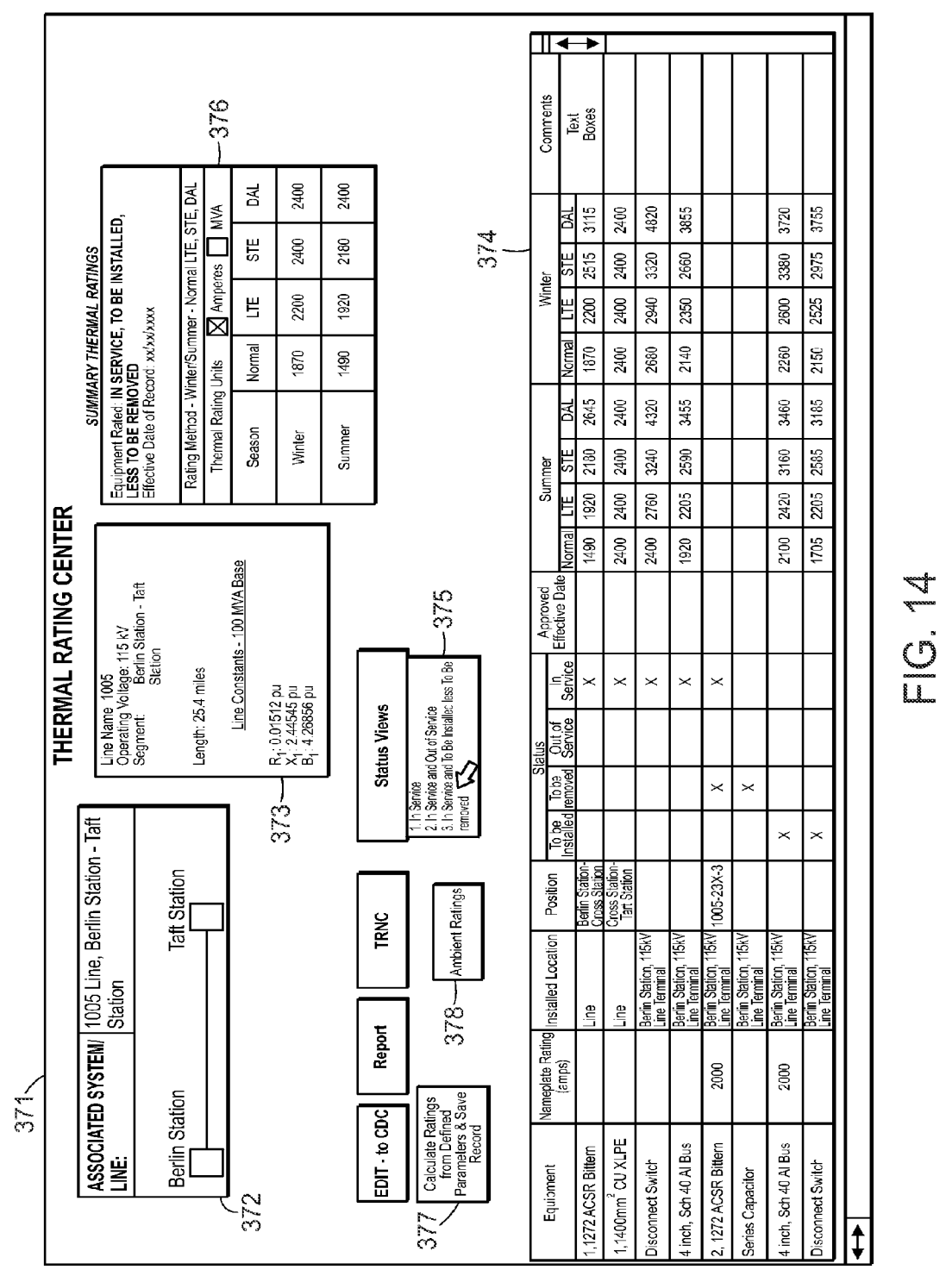

Finally, after all parameters for a particular resource have been set and applied, the user can begin the process of calculating the electric transfer capacity rating as a function of time duration of the one or more electric power facilities by selecting a run thermal ratings button 369 in the conductor rating conditions window 348 (FIG. 12). When the user makes this selection, he is directed to a thermal ratings window 371, as illustrated in FIG. 14. A facility analysis panel 372 shows the one or more electric power facilities being analyzed for its electric transfer capacity ratings. In this example, the electric transfer capacity ratings of a transmission line between two transmission stations is being calculated and optimized. Also, a facility summary panel 373 shows top-level information regarding the one or more electric power facilities being analyzed, such as operating voltage, length of the transmission line, and line constants.

A calculate command button 377 allows the user to initiate the process of calculating the electric transfer capacity ratings as a function of time for each resource present in the one or more electric power facilities. As a result, a resource thermal rating panel 374 itemizes summer and winter electric transfer capacity ratings for each resource based on different rating time durations (i.e. normal, long-term emergency, short-term emergency, drastic action limit). A status view panel 375 gives the user the ability to control which resources will appear in the resource thermal rating panel 374. In this example, since the "In Service and To Be Installed Less To Be Removed" option is selected in the status view panel 375, the resource thermal rating panel 374 displays all the resources present in the one or more electric power facilities. Other options in the status view panel 375 adjust the resource thermal rating panel 374 to hide the information concerning resources that are out of service or that are scheduled to be removed.

A summary thermal rating panel 376 is also included in the thermal ratings window 371. The summary thermal rating panel 376 compares the electric transfer capacity ratings of all the resources displayed in the thermal rating panel 374 and displays the minimum values for each rating time duration (i.e. Normal, LTE, STE, DAL). These minimum values in turn reflect the overall electric transfer capacity ratings of the one or more electric power facilities. Additionally, the user can adjust the units, such as amperes to apparent power (MVA), in which the electric transfer capacity ratings are calculated and displayed.

Figure 15:
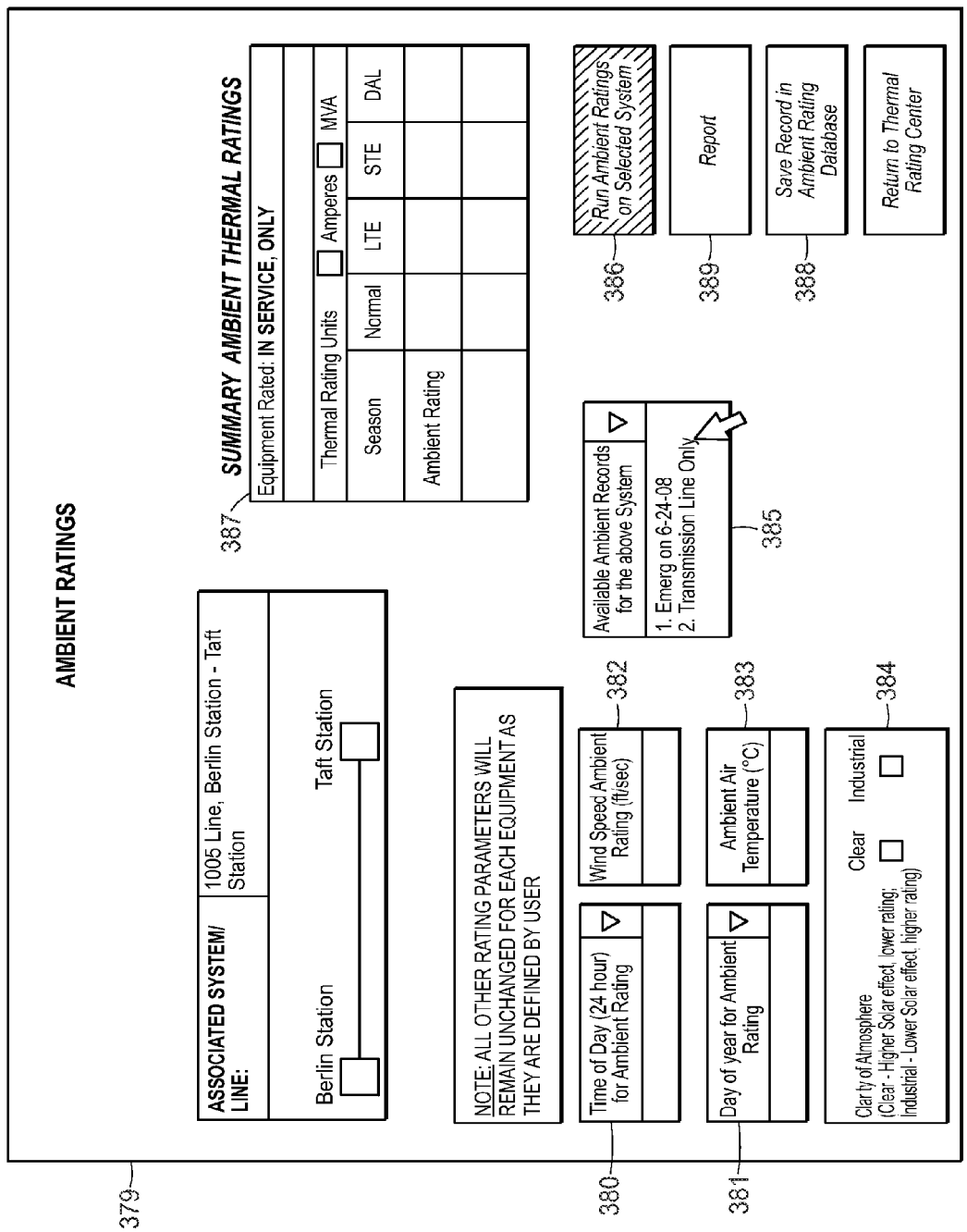
FIG. 15 is an exemplary view of a graphical user interface such as provided by embodiment of FIG. 6 having an ambient ratings window showing comprehensive electric transfer capacity rating of one or more electric power facilities with a defined plurality of variables.

FIG. 15 is an exemplary view of an ambient ratings window 379 of the GUI 107. To reach this application window, the user can select an ambient ratings button 378 in the thermal ratings window 371 (FIG. 14). In the ambient ratings window 379, the user is able to update various weather parameters and recalculate electric transfer capacity ratings according to these adjusted weather parameters. In this particular example, the ambient ratings window 379 provides a time-of-day panel 380 and day-of-year panel 381 for the user to specify values for the time of the day and the day of the year. In addition, the user can adjust the wind speed, air temperature, and clarity of atmosphere through a wind speed panel 382, air temperature panel 383, and atmospheric clarity panel 384, respectively. As an alternative to updating the time and weather parameters individually, the user can load a record of previously saved time and weather parameters via an ambient records panel 385. Once updated time and weather parameters are specified, the user must select a run button 386 to re-compute electric transfer capacity rating values as a function of time duration. The new electric transfer capacity rating values will then appear in a summary ambient ratings panel 387. After the new values have been computed, the user can save them into a record by selecting the save record button 388. Moreover, the user can begin the process of generating a report of the electric transfer capacity ratings by selecting a report button 389.

Figure 16:
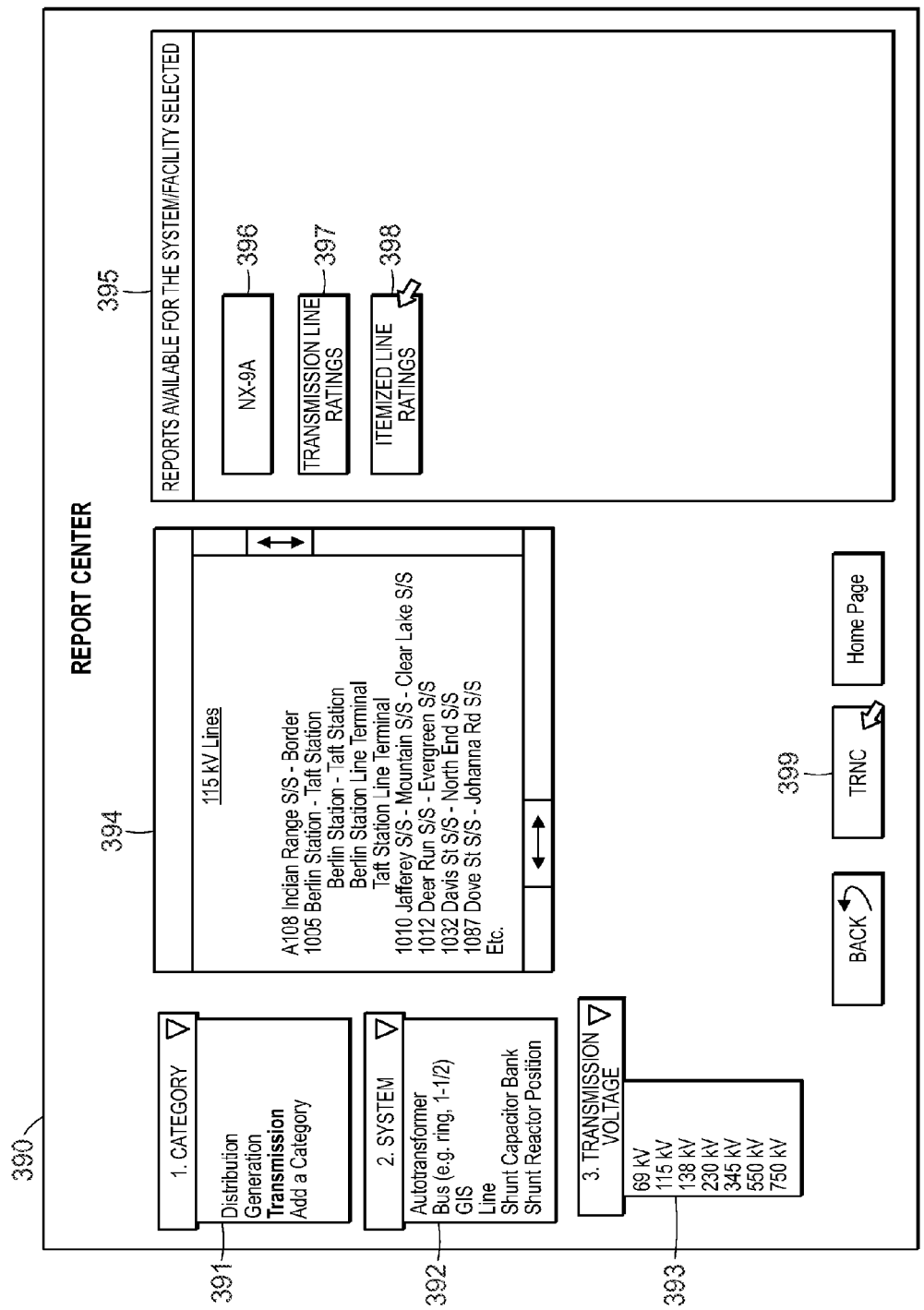
FIG. 16 is an exemplary view of a graphical user interface such as provided by embodiment of FIG. 6 having a report center window used for generating a report about electric capacity ratings of the one or more electric power facilities.

A report center window 390, as illustrated in FIG. 16, appears on the GUI 107 when the user selects the report button 389 in the ambient ratings window 379, or any report button displayed in any of the previously discussed windows. In the report center window 390, the user can choose to generate a report of the electric transfer capacity ratings for any of the one or more electric power facilities saved in a record in the memory unit 105. To choose a specific electric power facility, the user must select the category of electric power facility (i.e. distribution, generation, transmission) from a category panel 391. A system panel 392 subsequently displays a list of electric power facilities identified under the chosen category. After the user makes a selection in the system panel 392, a voltage panel 393 displays various voltage ratings in which the selected electric power facility may be rated. In this example, the user selected the "Transmission" option in the category panel 391, the "Line" option in the system panel 392, and the "115 kV" option the voltage panel 393. A query panel 394 then lists all available electric power facilities which meet the chosen criteria (i.e. user's selections).

From the query panel 394, the user selects the specific electric power facility for which he or she would like to generate a report. In addition, a report selection panel 395 gives the user the ability to choose the type of report to generate. In this example, the user can choose to generate a NX-9A document (i.e. facility rating and characteristics data implementation form), an overall electric transfer capacity ratings report, or an itemized electric transfer capacity ratings report by selecting a NX-9A button 396, line rating report button 397, or itemized rating report button 398, respectively. Once a report has been generated, the user can optimize the electric capacity ratings of other electric power facilities by selecting a trnc button 399 which navigates the user back to the thermal rating navigation window 304 (FIG. 7).

It should be noted that any time or weather related parameters which the user manually inputs into the system 100 can be automated and obtained from external sources 120. More specifically, the date-time panels 339, 340, 341, 342 of the rating parameters window 333 (FIG. 11), and the atmospheric panels 349-356 of the conduct rating conditions window 348 (FIG. 12) can be automatically retrieved from a clock source or third-party meteorological data services. The time-of-day panel 380, day-of-year panel 381, wind speed panel 382, air temperature panel 383, and atmospheric clarity panel 384 of the ambient ratings window 379 (FIG. 15) may also be updated in similar fashion.

Figure 17:
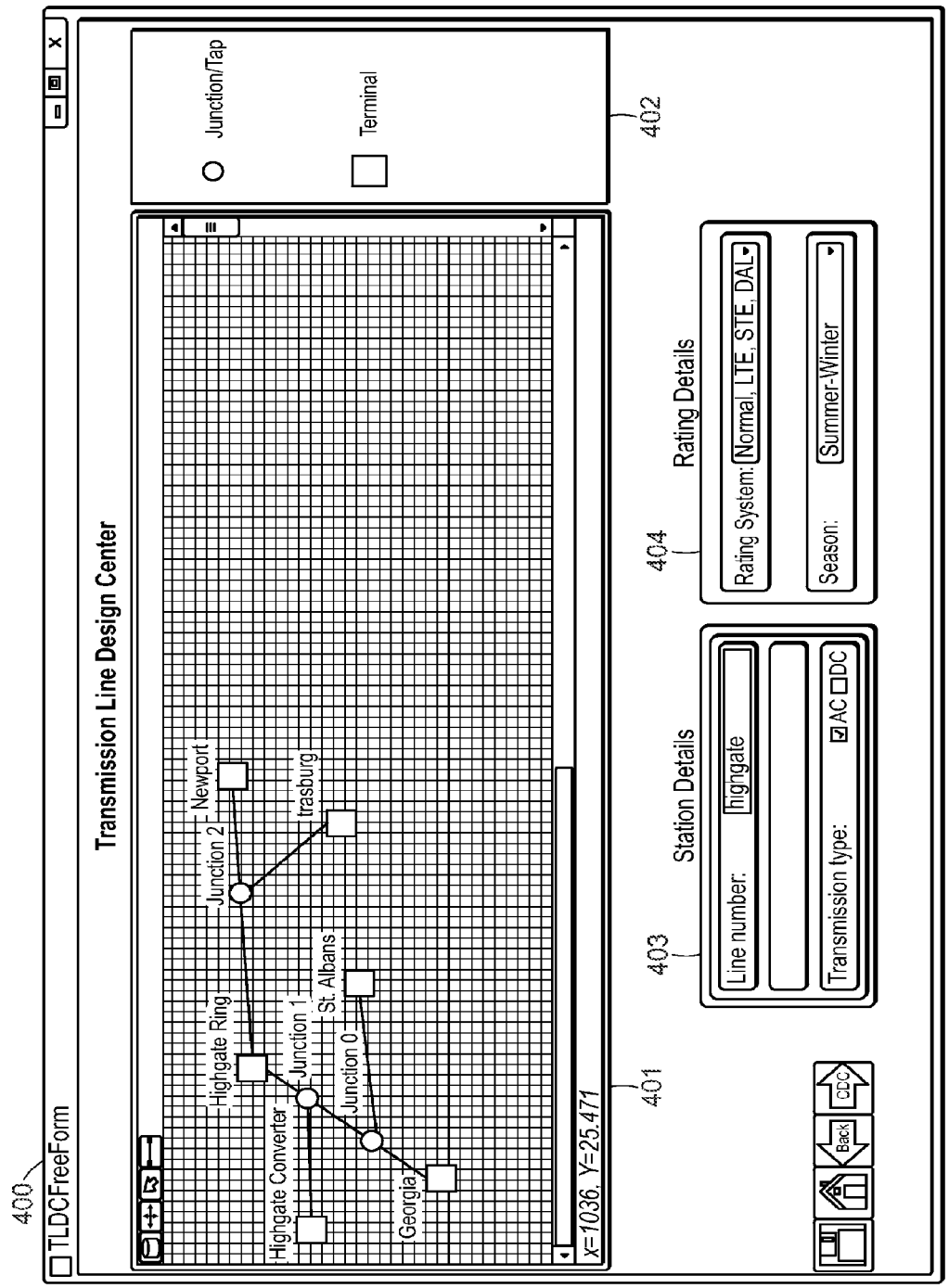
FIG. 17 is an exemplary view of a graphical user interface such as provided by embodiment of FIG. 6 having a transmission line design center window used for building a virtual model of transmission lines between electric transmission stations and electric shared stations.

FIG. 17 is an exemplary view of a transmission line design center window 400 of the GUI 107. In this particular window, the user is able to design a virtual model of a network of transmission lines between electric transmission stations and electric shared stations (i.e. substations). The transmission line design center window 400 provides a library panel 402 where visual objects representing transmission lines (e.g. overhead conductors, underground cables), junctions (i.e. electrical node), and power stations are listed. The user can select a visual object and drag-and-drop said visual object into a drafting panel 401. Within the drafting panel 401, the user can connect any sequence or combination of visual objects.

A station details panel 403 allows the user to specify the name and transmission type of each transmission line. Moreover, a rating details panel 404 lets the user designate the rating method and seasonal rating for the transmission lines. When a combination of visual objects representing a transmission line is saved, a mathematical rubric characterizes the combination and categorizes the combination into segments. The number of segments present in the combination depends on the quantity and orientation of stations and junctions used to create the transmission line. Each segment can then be selected in the component design window 324 and further defined by creating an electric circuit representation, using the symbols in equipment library panel 327. Furthermore, each segment can have its own electric transfer capacity rating calculated. These electric capacity ratings can subsequently be reported to regional transmission operators and sent to their energy management systems for efficient management of regional electric transmission grids.

Although the invention has been described with reference to particular arrangement of parts, features, and the like, these are not intended to exhaust all possible arrangements or features, and indeed many modifications and variations will be ascertainable to those of skill in the art.

Reference throughout the specification to "one embodiment", "another embodiment", "an embodiment", and so forth, means that a particular element (e.g. feature, structure, and/or characteristic) described in connection with the embodiment is included in at least one embodiment described herein, and may or may not be present in other embodiments. In addition, it is to be understood that the described elements may be considered in any suitable manner in the various embodiments.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "optional" or "optionally" are defined such that the subsequently described event or circumstance may or may not occur, and that the description includes instances where the event occurs and instances where it does not.

The term "electric transfer capacity rating" or "transfer capacity", as used herein are defined as the quantity of electrical power or electric current for a given time duration an electrical component(s) or electric power facility(s) comprised of electrical components can allow to transfer (i.e. pass) through the component(s) or facility without compromising the integrity of the electrical component(s) of electric power facility.

The term electric power facility, as used herein is defined as system comprised of electrical components used in electric power distribution, generation and transmission. The terms function of time or function of time duration, as used herein are defined as for a given time period.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. An electric capacity rating system for determining the quantity of electrical energy that can flow through electric power facilities for a given time period and at any given point in time, comprising:
   a processor for receiving and storing information about the capability of resources to transfer electric power in one or more electric power facilities;
   a capability datastore in communication with said processor for determining electrical transfer capabilities of each resource in the one or more electric power facilities for a given time period and at any given point in time, wherein the resources include: overhead line conductors, underground cables, conductor splices, conductor compression terminals, buses, disconnects, wave traps, current limiting reactors, circuit breakers, circuit switches, current transformers, series capacitors, shunt capacitors, substations and relays;
   an external factors datastore for determining a plurality of variables which affect said electrical transfer capabilities of electric power facilities; and
   a resource manager for allocating said plurality of resources by optimizing said electrical transfer capabilities of electric power facilities for a given time period and at any given point in time based on said plurality of variables;
   said resource manager correlating said plurality of variables with said electrical transfer capabilities of each resource to compute an overall electric transfer capacity rating for a given time period and at a given point in time for said one or more electric power facilities, wherein the overall electric transfer capacity rating indicates the quantity of electrical energy that can flow through said one or more electric power facilities; and
   said resource manager, said external factors datastore, and said capability datastore being in processing communication with said processor and with each other.

2. The system according to claim 1, wherein said processor commands a memory unit in order to read and write compiled data to said memory unit,
   said compiled data comprises information about said plurality of resources, said electrical transfer capabilities of electric power facilities for a given time period and at any given point in time, and said plurality of variables;
   said memory unit comprises an internal memory integrated with said processor.

3. The system according to claim 2, wherein said memory unit further comprises an external memory accessible by said processor.

4. The system according to claim 2, further comprising at least one data port interface supporting a plurality of independent communication channels in processing communication with each other and with said processor and said memory unit;
   wherein said processor sends and receives said compiled data and said computed electric transfer capacity ratings, through said plurality of independent communication channels, to and from said memory unit, respectively.

5. The system according to claim 4, wherein said plurality of resources comprises electric generation, distribution and transmission components, said plurality of variables comprises material and construction characteristics of electric generation, distribution and transmission components, said plurality of variables comprises weather parameters, said plurality of variables comprises geographic location on earth where electric power facilities reside, and said electrical transfer capabilities comprises either generation, distribution or transmission transfer capabilities.

6. The system according to claim 5, wherein said weather parameters include ambient temperatures, wind speed, wind direction, clarity of atmosphere, solar radiation, air density, air viscosity, and air thermal conductivity;
- wherein said geographic location on earth include latitude and longitudinal coordinates and elevation above sea level;
- wherein said material and construction characteristics of electric generation, distribution and transmission components include color of painted surfaces, type and dimensions of electrical insulating materials, type of metals, dimensions and configuration of said components;
- wherein said electrical capabilities include resource equipment properties, resource composition, resource construction, and resource thermal limits of materials used to construct said plurality of components and resources; and
- wherein said plurality of variables further comprises orientation of each of said plurality of resources, time of day, day of year, and seasonal period.

7. The system according to claim 6, wherein said plurality of variables can be used to dynamically or manually compute electric transfer capacity by external sources by a system user;
- said external factors datastore can define said plurality of variables using old values previously saved in said memory unit if dynamic updates from said external sources or manual updates are not available.

8. The system according to claim 7, wherein said processor obtains said electrical capabilities from said capability datastore and directs said resource manager to associate each of said plurality of resources with a mathematical routine including one or more formulas or algorithms;
- said mathematical routine reflecting said electrical transfer capabilities for a given time period of each of said plurality of resources; and
- wherein said resource manager links together each of said mathematical routines and forms a comprehensive representation of said one or more electric power facilities as a homogenous system;
- said processor saving a record of said comprehensive representation in said memory unit.

9. The system according to claim 8, wherein said external factors datastore retrieves updated values of said plurality of variables from said external sources;
- said processor directs said resource manager to use said updated values of said plurality of variables and said electrical transfer capabilities to define unknown quantities within said comprehensive representation;
- said resource manager calculates a current value of said electric transfer capacity rating using said comprehensive representation; and
- said processor saves said current value of said electric transfer capacity rating to said memory unit.

10. The system according to claim 9, wherein said processor generates an analytical report documenting said compiled data and said electric transfer capacity rating, which are stored in said memory unit;
- said processor communicating said analytical report to external entities.

11. The system according to claim 9, further comprising a graphical user interface to assist in operating and automating said system;
- said graphical user interface displaying said compiled data and said electric capacity rating, which are stored in said memory unit.

12. The system according to claim 9, wherein said resource manager determines higher electric capacity ratings as for a given time period by optimizing said electrical transfer capabilities with said plurality of resources given said updated values of said plurality of variables, and said resource manager determines said higherelectric transfer capacity ratings for a given time period and at any given point in time according to set rules pertaining to safety limits and physical limits of said plurality of resources.

13. The system according to claim 12, wherein said processor interprets and manipulates a plurality of Supervisory Command and Data Acquisition (SCADA) systems by communicating said electric transfer capacity ratings to said plurality of SCADA systems through at least one peripheral link.

14. A method for optimizing electric loading transfer capability, comprising:
- establishing processing communication between a resource manager, an external factors datastore, a capability datastore, and a processor;
- receiving and storing information about resources in one or more electric power facilities by said processor;
- determining electrical transfer capabilities of each resource in the one or more electric power facilities for a given time period and at any given point in time using said capability datastore, wherein the resources include: overhead line conductors, underground cables, conductor splices, conductor compression terminals, buses, disconnects, wave traps, current limiting reactors, circuit breakers, circuit switches, current transformers, series capacitors, shunt capacitors, substations and relays;
- determining a plurality of variables which affect said electrical transfer capabilities using said external factors datastore;
- allocating said plurality of resources by using said resource manager to optimize said electrical transfer capabilities for a given time period and at any given point in time based on said plurality of variables;
- correlating said plurality of variables with said electrical transfer capabilities of each resource to generate an overall electric transfer capacity rating for a given time period and at a given point in time of said one or more electric power facilities by using said resource manager, wherein the overall electric transfer capacity rating indicates the quantity of electrical energy that can flow through said one or more electrical power facilities.

15. The method according to claim 14, farther comprising:
- reading, writing, and storing compiled data to a memory unit by said processor; and
- providing a plurality of security levels in said memory unit to accommodate different standards of conduct between regulated and unregulated groups involved with said one or more electric power facilities;
- said compiled data comprises information about said plurality of resources, said electrical transfer capabilities, and said plurality of variables.

16. The method according to claim 15, further comprising updating said plurality of variables dynamically by using external sources and manually by a system user; and
- defining, said plurality of variables with old values previously saved in said memory unit, by using said external factors datastore, if dynamic updates from said external sources or manual updates are not available.

17. The method according to claim 16, further comprising:
retrieving said electrical transfer capabilities from said capability datastore by said processor; and
directing said resource manager to associate each of said plurality of resources with a mathematical routine including one or more formulas or algorithms, said mathematical routine reflecting said electrical transfer capabilities of each of said plurality of resources;
linking; together each of said mathematical routines using said resource manager;
forming a comprehensive representation of said one or more electric power facilities as a homogenous system; and
saving a record of said comprehensive representation in said memory unit by said processor.

18. The method according to claim 17, further comprising:
retrieving updated values of said plurality of variables from said external sources by using said external factors datastore;
directing said resource manager by said processor to use said updated values of said plurality of variables and said electrical transfer capabilities to define unknown quantities within said comprehensive representation;
calculating a current value of said electric transfer capacity rating for a given time period by said resource manager using said comprehensive representation; and
saving said current value of said electric transfer capacity rating for a given time period to said memory unit by said processor.

19. The method according to claim 18, further comprising determining higher electric capacity ratings for a given time period using said resource manager to optimize said electrical transfer capabilities with said plurality of resources given said updated values of said plurality of variables; and determining said higher electric transfer capacity ratings according to set rules pertaining to safety limits and physical limits of said plurality of resources.

20. A computer program product comprising an optimized electric loading transfer tool including a non-transitory computer usable medium having computer readable program code means for causing a computer to effect method steps of:
establishing processing communication between a resource manager, an external factors datastore, a capability datastore, and a processor;
receiving and storing information about resources in one or more electric power facilities by said processor;
determining electrical transfer capabilities of each resource in the one or more electric power facilities for a given time period and at any given point in time using said capability datastore, wherein the resources include: overhead line conductors, underground cables, conductor splices, conductor compression terminals, buses, disconnects, wave traps, current limiting reactors, circuit breakers, circuit switches, current transformers, series capacitors, shunt capacitors, substations and relays;
determining a plurality of variables which affect said electrical transfer capabilities using said external factors datastore;
allocating said plurality of resources by using said resource manager to optimize said electrical transfer capabilities for a given time period and at any given point in time based on said plurality of variables;
correlating said plurality of variables with said electrical transfer capabilities of each resource to generate an overall electric transfer capacity rating for a given time period and at a given point in time of said one or more electric power facilities by using said resource manager: wherein the overall electric transfer capacity rating indicates the quantity of electrical energy that can flow through said one or more electric power facilities.

* * * * *